(12) United States Patent
Powell et al.

(10) Patent No.: US 7,875,089 B2
(45) Date of Patent: Jan. 25, 2011

(54) AMMONIA-BASED HYDROGEN GENERATION APPARATUS AND METHOD FOR USING SAME

(75) Inventors: Michael Roy Powell, Kennewick, WA (US); Charles J. Call, Albuquerque, NM (US)

(73) Assignee: Intelligent Energy, Inc., Long Beach, CA (US)

( * ) Notice: Subject to any disclaimer, the term of this patent is extended or adjusted under 35 U.S.C. 154(b) by 1062 days.

(21) Appl. No.: 10/469,464

(22) PCT Filed: Mar. 4, 2002

(86) PCT No.: PCT/US02/06767

§ 371 (c)(1),
(2), (4) Date: Mar. 22, 2004

(87) PCT Pub. No.: WO02/071451

PCT Pub. Date: Sep. 12, 2002

(65) Prior Publication Data

US 2004/0154223 A1 Aug. 12, 2004

(51) Int. Cl.
| | |
|---|---|
| B01J 7/00 | (2006.01) |
| B01J 8/00 | (2006.01) |
| B01D 53/34 | (2006.01) |
| B01D 53/56 | (2006.01) |
| H01M 8/06 | (2006.01) |
| C01B 3/24 | (2006.01) |
| C01B 21/00 | (2006.01) |
| C01B 6/00 | (2006.01) |
| C01C 1/00 | (2006.01) |

(52) U.S. Cl. .................. 48/61; 48/127.9; 48/198.3; 423/237; 423/238; 423/351; 423/352; 423/645

(58) Field of Classification Search ................. 48/198.3, 48/127.9, 61; 423/237, 238, 351, 352, 645
See application file for complete search history.

(56) References Cited

U.S. PATENT DOCUMENTS 3,480,419 A  11/1969  Louis et al.

(Continued)

FOREIGN PATENT DOCUMENTS

DE  39 26 466 C 2  12/1996

(Continued)

*Primary Examiner*—Alexa D Neckel
*Assistant Examiner*—Matthew J Merkling
(74) *Attorney, Agent, or Firm*—Luce Forward Hamilton & Scripps, LLP; Technology Law Group; Mark H. Krietzman; Mark I. Bentley

(57) ABSTRACT

A hydrogen generation apparatus employs a thermocatalytic reactor (60) formed of a top plate (62), a bottom plate (66), and a reactor core (64) disposed between the top an bottom plates. The reactor core has a reaction surface (64a) and a combustion surface (64b), each surface having a raised periphery defining opposing ends (61a and 61b) and opposing sides (63a and 63b). The reaction surface (64a) and the top plate (62) together define a reaction chamber and the combustion surface (64b) and the bottom plate (66) together define a combustion chamber. The reactor core (64) has a first set of a plurality of spaced apart, substantially straight radiating fins (76a) extending from the reaction surface (64a) and a second set of a plurality of spaced part, substantially straight radiating fins (76b) extending from the combustion surface (64b). The first set of fins (76a) defining a plurality of reaction channels (71), while the second set of fins (76b) defines a plurality of combustion channels (69) running parallel to the opposing sides (63a and 63b) and is spaced apart from the opposing ends (61a and 61b).

54 Claims, 8 Drawing Sheets

U.S. PATENT DOCUMENTS

| | | | |
|---|---|---|---|
| 3,505,027 A | 4/1970 | Breitbach et al. | |
| 3,682,142 A | 8/1972 | Newkirk | 123/3 |
| 3,907,511 A | 9/1975 | Forbes et al. | |
| 4,088,450 A | 5/1978 | Kosaka et al. | 23/288 |
| 4,098,587 A | 7/1978 | Krar et al. | 48/94 |
| 4,098,588 A | 7/1978 | Buswell et al. | 48/94 |
| 4,098,589 A | 7/1978 | Buswell et al. | 48/94 |
| 4,106,439 A | 8/1978 | Kanao | |
| 4,113,838 A | 9/1978 | Koike et al. | |
| 4,155,712 A | 5/1979 | Taschek | 422/239 |
| 4,157,270 A | 6/1979 | Martingnoni et al. | |
| 4,211,537 A | 7/1980 | Teitel | 48/191 |
| 4,248,941 A | 2/1981 | Louis et al. | 429/13 |
| 4,293,315 A | 10/1981 | Sederquist | 48/94 |
| 4,438,082 A | 3/1984 | Dettling | |
| 4,454,207 A | 6/1984 | Frioli et al. | 429/17 |
| 4,624,841 A | 11/1986 | Hidaki | |
| 4,650,727 A | 3/1987 | Vanderborgh et al. | 429/19 |
| 4,670,359 A | 6/1987 | Beshty et al. | 429/17 |
| 4,671,893 A | 6/1987 | Pinto | |
| 4,692,306 A | 9/1987 | Minet et al. | 422/49 |
| 4,737,161 A | 4/1988 | Szydiowski et al. | 48/61 |
| 4,746,329 A | 5/1988 | Christner et al. | 48/61 |
| 4,761,164 A | 8/1988 | Pez et al. | |
| 4,781,214 A | 11/1988 | Scaramucci | |
| 4,781,241 A | 11/1988 | Misage et al. | |
| 4,861,347 A | 8/1989 | Szydiowski et al. | 48/61 |
| 4,933,242 A | 6/1990 | Koga et al. | 429/19 |
| 5,015,444 A | 5/1991 | Koga et al. | 422/195 |
| 5,084,363 A | 1/1992 | Reiser | 429/19 |
| 5,215,729 A | 6/1993 | Buxbaum | 423/248 |
| 5,221,524 A | 6/1993 | Eguchi | 422/189 |
| 5,222,551 A * | 6/1993 | Hasegawa et al. | 165/167 |
| 5,360,461 A | 11/1994 | Meinzer | |
| 5,389,230 A | 2/1995 | Veluswamy | |
| 5,432,023 A | 7/1995 | Yamada et al. | |
| 5,601,937 A | 2/1997 | Isenberg | 429/17 |
| 5,609,834 A | 3/1997 | Hamada et al. | 422/196 |
| 5,612,012 A | 3/1997 | Soma et al. | 423/246 |
| 5,618,322 A | 4/1997 | Mizuno et al. | 48/197 |
| 5,631,099 A | 5/1997 | Hockaday | 429/30 |
| 5,641,585 A | 6/1997 | Lessing et al. | 429/26 |
| 5,648,182 A | 7/1997 | Hara et al. | 429/20 |
| 5,652,020 A | 7/1997 | Collins et al. | |
| 5,676,911 A * | 10/1997 | Baumert et al. | 422/200 |
| 5,686,196 A | 11/1997 | Singh et al. | 429/17 |
| 5,702,491 A | 12/1997 | Long et al. | 48/197 |
| 5,733,347 A | 3/1998 | Lesieur | 48/61 |
| 5,741,474 A | 4/1998 | Isomura | |
| 5,746,985 A | 5/1998 | Takahashi | 422/173 |
| 5,759,712 A | 6/1998 | Hockaday | 429/30 |
| 5,776,421 A | 7/1998 | Matsumura et al. | 422/197 |
| 5,780,179 A | 7/1998 | Okamoto | 429/20 |
| 5,811,062 A | 9/1998 | Wegeng et al. | 422/129 |
| 5,858,314 A | 1/1999 | Hsu et al. | 422/211 |
| 5,861,137 A | 1/1999 | Edlund | 423/652 |
| 5,888,273 A | 3/1999 | Buxbaum | 95/56 |
| 5,897,970 A | 4/1999 | Isomura et al. | 429/9 |
| 5,904,754 A | 5/1999 | Buxbaum | |
| 5,938,800 A | 8/1999 | Verrill et al. | 48/127.9 |
| 5,942,346 A | 8/1999 | Ahmed et al. | 429/20 |
| 5,961,932 A | 10/1999 | Ghosh et al. | 422/193 |
| 5,976,725 A | 11/1999 | Gamo et al. | 429/25 |
| 5,980,726 A | 11/1999 | Moulthrop, Jr. et al. | 205/637 |
| 5,997,594 A | 12/1999 | Edlund et al. | 48/76 |
| 6,007,606 A | 12/1999 | Baksh et al. | 95/98 |
| 6,007,699 A | 12/1999 | Cole | |
| 6,045,933 A | 4/2000 | Okamoto | 429/17 |
| 6,057,051 A | 5/2000 | Uchida et al. | 429/19 |
| 6,083,425 A | 7/2000 | Clawson et al. | 252/372 |
| 6,096,286 A | 8/2000 | Autenriieth | 423/651 |
| 6,103,143 A | 8/2000 | Sircar et al. | 252/373 |
| 6,103,441 A | 8/2000 | Matsubayashi et al. | 429/17 |
| 6,122,909 A | 9/2000 | Murphy et al. | |
| 6,126,723 A | 10/2000 | Drost et al. | 96/4 |
| 6,126,908 A | 10/2000 | Clawson et al. | 422/190 |
| 6,129,861 A | 10/2000 | Muesinger et al. | 275/376 |
| 6,152,987 A | 11/2000 | Buxbaum | |
| 6,152,995 A | 11/2000 | Edlund | 96/4 |
| 6,159,434 A | 12/2000 | Gonjo et al. | 422/191 |
| 6,171,574 B1 | 1/2001 | Buxbaum | |
| 6,180,846 B1 | 1/2001 | Dandekar et al. | 585/443 |
| 6,183,703 B1 | 2/2001 | Hsu et al. | 422/211 |
| 6,183,895 B1 | 2/2001 | Kudo et al. | 429/20 |
| 6,190,124 B1 | 2/2001 | Romatier | 422/200 |
| 6,190,623 B1 | 2/2001 | Sanger et al. | 422/192 |
| 6,192,596 B1 | 2/2001 | Bennett et al. | 34/76 |
| 6,200,536 B1 | 3/2001 | Tonkovich et al. | 422/177 |
| 6,207,122 B1 | 3/2001 | Clawson et al. | 423/418.2 |
| 6,207,132 B1 | 3/2001 | Lin et al. | 423/648.1 |
| 6,221,117 B1 | 4/2001 | Edlund et al. | 48/76 |
| 6,231,831 B1 | 5/2001 | Autenrieth et al. | 423/648.1 |
| 6,232,005 B1 | 5/2001 | Pettit | 429/19 |
| 6,238,465 B1 | 5/2001 | Buxbaum | |
| 6,242,120 B1 | 6/2001 | Herron | 429/22 |
| 6,244,367 B1 | 6/2001 | Ahmed et al. | 180/65.1 |
| 6,245,303 B1 | 6/2001 | Bentley et al. | 422/193 |
| 6,245,309 B1 | 6/2001 | Etievant et al. | 423/248 |
| 6,254,839 B1 | 7/2001 | Clawson et al. | 422/190 |
| 6,254,848 B1 | 7/2001 | Autenrieth et al. | 423/648.1 |
| 6,264,856 B1 | 7/2001 | Autenrieth et al. | 252/373 |
| 6,268,077 B1 | 7/2001 | Kelley et al. | 429/33 |
| 6,269,625 B1 | 8/2001 | Dibble et al. | |
| 6,274,093 B1 | 8/2001 | Long et al. | 422/129 |
| 6,280,864 B1 | 8/2001 | Towler et al. | 429/17 |
| 6,284,398 B1 | 9/2001 | Kiryu | 429/19 |
| 6,294,276 B1 | 9/2001 | Ogino | 429/17 |
| 6,296,814 B1 | 10/2001 | Bonk et al. | 422/196 |
| 6,299,744 B1 | 10/2001 | Narayanan et al. | 204/263 |
| 6,299,994 B1 | 10/2001 | Towler et al. | 429/17 |
| 6,319,306 B1 | 11/2001 | Edlund et al. | 96/7 |
| 6,326,097 B1 | 12/2001 | Hockaday | 429/34 |
| 6,329,091 B1 | 12/2001 | James | 429/19 |
| 6,331,281 B1 * | 12/2001 | Teru et al. | 423/237 |
| 6,338,913 B1 | 1/2002 | Eshraghi | 429/41 |
| 6,348,278 B1 | 2/2002 | LaPierre et al. | 429/17 |
| 6,350,297 B1 | 2/2002 | Doyle et al. | |
| 6,352,792 B1 | 3/2002 | Parchamazad | 429/20 |
| 6,368,735 B1 | 4/2002 | Lomax et al. | |
| 6,372,363 B1 | 4/2002 | Buxbaum | |
| 6,375,906 B1 | 4/2002 | Edlund et al. | 422/189 |
| 6,376,113 B1 | 4/2002 | Edlund et al. | 429/19 |
| 6,383,670 B1 | 5/2002 | Edlund et al. | 429/20 |
| 6,413,479 B1 | 7/2002 | Kudo et al. | |
| 6,419,728 B1 | 7/2002 | Edlund | 96/4 |
| 6,451,464 B1 | 9/2002 | Edlund et al. | 429/19 |
| 6,458,189 B1 | 10/2002 | Edlund et al. | 96/7 |
| 6,465,118 B1 | 10/2002 | Dickman et al. | 429/20 |
| 6,470,569 B1 * | 10/2002 | Lippert et al. | 29/890 |
| 6,488,900 B1 | 12/2002 | Call et al. | |
| 6,503,298 B1 | 1/2003 | Monzyk et al. | |
| 6,627,338 B2 | 9/2003 | St-Pierre et al. | |
| 6,653,005 B1 | 11/2003 | Muradov | |
| 6,869,707 B2 | 3/2005 | Edlund et al. | |
| 7,048,897 B1 * | 5/2006 | Koripella et al. | 422/198 |
| 7,056,369 B2 | 6/2006 | Beisswenger et al. | |
| 7,077,643 B2 | 7/2006 | Holladay et al. | |
| 2001/0000380 A1 | 4/2001 | Buxbaum | |
| 2001/0018140 A1 | 8/2001 | Hermann et al. | 429/20 |
| 2001/0021359 A1 | 9/2001 | Johnston | |
| 2001/0045061 A1 | 11/2001 | Edlund et al. | 48/76 |
| 2001/0045364 A1 | 11/2001 | Hockaday et al. | 205/338 |
| 2001/0049038 A1 | 12/2001 | Dickman et al. | 429/19 |
| 2001/0053472 A1 | 12/2001 | Edlund | 429/46 |

| | | | | | |
|---|---|---|---|---|---|
| 2002/0000066 A1 | 1/2002 | Bentley et al. ............... 48/61 | 2005/0244684 A1 | 11/2005 | Koripella |
| 2002/0000067 A1 | 1/2002 | Numata et al. ............... 48/61 | | | |
| 2002/0006369 A1 | 1/2002 | Buxbaum ................. 422/211 | | FOREIGN PATENT DOCUMENTS | |
| 2002/0007594 A1 | 1/2002 | Muradov .................... 48/78 | DE | 19902926 A1 | 3/2000 |
| 2002/0021992 A1 | 2/2002 | Bass et al. ............... 422/196 | EP | 0 861 802 A2 | 2/1998 |
| 2002/0022167 A1 | 2/2002 | Herron ..................... 429/22 | EP | 0 906 890 A1 | 4/1999 |
| 2002/0025458 A1 | 2/2002 | Faville et al. | EP | 1 061 039 | 12/2000 |
| 2002/0028171 A1* | 3/2002 | Goetsch et al. .......... 423/237 | EP | 1208904 A | 5/2002 |
| 2002/0071976 A1 | 6/2002 | Edlund ..................... 429/19 | GB | 97 21 66 | 10/1964 |
| 2002/0083645 A1 | 7/2002 | Edlund ..................... 48/195 | JP | 54023942 | 2/1979 |
| 2002/0083829 A1 | 7/2002 | Edlund et al. ............... 95/55 | JP | 0119166 | 7/1983 |
| 2002/0114762 A1 | 8/2002 | Wong et al. .............. 423/656 | JP | 05078810 A | 3/1993 |
| 2002/0114984 A1 | 8/2002 | Edlund et al. ............... 429/19 | JP | 10330992 | 12/1998 |
| 2002/0116872 A1 | 8/2002 | Edlund et al. ............ 48/127.9 | JP | 411255501 A | 9/1999 |
| 2002/0119353 A1 | 8/2002 | Edlund et al. ............... 429/19 | JP | 02000159502 A | 6/2000 |
| 2002/0127445 A1 | 9/2002 | Carpenter et al. | JP | 02000281312 A | 10/2000 |
| 2002/0127447 A1 | 9/2002 | Edlund et al. ............... 429/19 | WO | WO 96/29751 | 9/1996 |
| 2002/0146604 A1 | 10/2002 | Matoba | WO | WO 97/17125 | 5/1997 |
| 2003/0068269 A1 | 4/2003 | Matzakos et al. | WO | WO 98/00878 | 1/1998 |
| 2003/0191199 A1 | 10/2003 | O'Rear | WO | WO 99/17867 | 4/1999 |
| 2003/0232224 A1* | 12/2003 | Kordesch et al. ............. 429/17 | WO | WO 99/43610 | 9/1999 |
| 2004/0154223 A1 | 8/2004 | Powell et al. | WO | WO 99/66279 | 12/1999 |
| 2004/0187386 A1 | 9/2004 | Wangerow et al. | WO | WO 9964146 A1 * | 12/1999 |
| 2004/0191137 A1 | 9/2004 | Chellappa | WO | WO 00/78434 A | 12/2000 |
| 2004/0194626 A1 | 10/2004 | Chellappa et al. | WO | WO 0112539 | 2/2001 |
| 2004/0219423 A1 | 11/2004 | Tunney et al. | WO | WO 0126174 | 4/2001 |
| 2005/0016729 A1 | 1/2005 | Savage | WO | WO 0150541 | 7/2001 |
| 2005/0022448 A1 | 2/2005 | Kaye | WO | WO 0177011 | 10/2001 |
| 2005/0039400 A1 | 2/2005 | Lau et al. | WO | WO 02/071451 A2 | 9/2002 |
| 2005/0042165 A1 | 2/2005 | Akiyama et al. | WO | WO 02/086987 A2 | 10/2002 |
| | | | WO | WO 03/035547 A1 | 5/2003 |
| | | | WO | WO 03/055585 | 7/2003 |

* cited by examiner

AMMONIA-BASED HYDROGEN GENERATION APPARATUS AND METHOD FOR USING SAME

GOVERNMENT RIGHTS

This invention was made under contract with the United States Army Research Office, under Contract No. DAAD19-01-C-0002, and the United States Government may have certain rights in the invention.

FIELD OF THE INVENTION

The present invention generally relates to the chemical arts. More particularly, the present invention relates to an apparatus and method for generating hydrogen gas by decomposing ammonia from an ammonia source.

BACKGROUND OF THE INVENTION

Hydrogen/air fuel cells (H/AFCs) have enormous potential as a replacement for batteries. Because they can operate on very energy-dense fuels, fuel cell-based power supplies offer high energy-to-weight ratios compared with even state-of-the-art batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly where small size and low weight are desirable.

Functionally, fuel cells generate electricity by reacting hydrogen with oxygen to produce water. Since oxygen can typically be obtained from the ambient atmosphere, only a source of hydrogen must be provided to operate a fuel cell. Merely providing compressed hydrogen is not always a viable option, because of the substantial volume that even a highly compressed gas occupies. Liquid hydrogen, which occupies less volume, is a cryogenic liquid, and a significant amount of energy is required to maintain the extremely low temperatures required to maintain it as a liquid.

Several alternative approaches are available. These alternatives include hydrocarbon and methanol fuel reforming, hydrogen absorption into metal hydrides, hydrogen-generating chemical reactions, and ammonia decomposition. The ammonia decomposition reaction can be represented as follows:

$$2NH_3 + ENERGY \rightarrow N_2 + 3H_2$$

Generating hydrogen from ammonia is particularly attractive because the usable hydrogen yield per kilogram of ammonia is relatively high, and the decomposition of ammonia to generate hydrogen is a well understood and relatively straightforward reaction. Because ammonia is readily available and relatively inexpensive, and because it offers a substantial yield of hydrogen, it is a desideratum to develop an efficient apparatus for processing ammonia to generate hydrogen for fuel cells and other purposes.

To compete with battery-based power supplies, such an H/AFC apparatus needs to be compact and reliable. It is a further desideratum to develop a portable hydrogen supply with a volume less than 1 liter and a mass less than 1 kg that can produces up to 50 watts of electrical power, with a total energy output of 1 kWh. Commercially available metal hydride storage cylinders are available in 920 gm cylinders that contain the equivalent of 100 W-h of hydrogen; thus, a total energy output of 1 kWh represents an order of magnitude increase in energy density over commercially available apparatuses.

One of the challenges of utilizing ammonia to produce hydrogen for a fuel cell is that H/AFCs do not tolerate ammonia in the hydrogen feed gas, so the trace amounts of ammonia in the $H_2/N_2$ gas mixture produced by an ammonia cracker must be removed before the mixture is supplied to a fuel cell. Commercially available ammonia adsorbents (e.g., acid-impregnated carbon) can be used for this purpose, but the required adsorbent mass of such materials can be prohibitively large, if the ammonia-cracking reactor does not provide high conversion efficiency.

Employing a relatively high reaction temperature (over 850° C.) reduces the amount of ammonia in the $H_2/N_2$ product, and the amount of adsorbent required. However, using such a high reaction temperature imposes significant design challenges. While the mass of adsorbent required is reduced, high temperature reactors must be fabricated of high temperature refractory metals, such as Inconel and molybdenum. These materials often require complex fabrication techniques, such as diffusion bonding, as opposed to more conventional brazing or laser welding techniques that can be used with more conventional materials, such as stainless steel or titanium.

Furthermore, for any given design, heat loss to the ambient environment from a reactor is increased as the reactor temperature is increased. Increasing the reactor temperature reduces overall energy efficiency or results in an increase in the apparatus size and weight due to the requirement for additional insulation.

Furthermore, the hydrogen generation reactor employs a catalyst. Catalysts have a minimum temperature, referred to as the light-off temperature, at which the catalyst facilitates the ammonia decomposition reaction, and a maximum operating temperature, which is generally a function of the catalyst and its support matrix, if any. Catalytic materials are often dispersed in a support matrix. For example, it is very common to distribute catalytic material on an alumina support. Such supports have a maximum allowed operating temperature. For example, in excess of 850° C., an alumina support can become sintered, (i.e., the alumina support components begin to fuse together). At that point, the efficiency of the catalyst drops dramatically. Consequently, temperatures in excess of 850° C. are incompatible with many types of potential catalysts, particularly supported catalysts.

By lowering the reactor temperature and accepting an increase in the levels of residual ammonia in the $H_2/N_2$ product, the design constraints on the apparatus are reduced. Conventional materials and fabrication techniques can be employed and a greater variety of catalysts and catalyst supports can be used. However, in prior art designs, a relatively large volume of adsorbent is required to remove the residual ammonia, significantly increasing the mass of the low temperature hydrogen generating apparatus.

Because creating a compact hydrogen generating apparatus is critical to increasing the utilization of fuel cell technology, decreasing the mass of adsorbent required to enable a relatively low reactor temperature apparatus to be used is critical to minimizing the size of such a compact apparatus. For example, in the target apparatus capable of producing 50 Watts power and 1 kWh of energy, and having a mass of 1 kg, if the ammonia reactor runs at a 99.0% conversion, a total of 3.33 g of ammonia must be removed from the $H_2/N_2$ gas mixture exiting the reactor. Commercially available ammonia adsorbents may collect only up to about 1% by weight of ammonia (given a relatively low concentration of ammonia in a gas stream) in the presence of traces of water (ppm levels) that is typically present in commercial grade ammonia, so about 333 g of adsorbent would be required for an ammonia-cracking reactor running at 99.0% conversion efficiency. Thus, the adsorbent mass alone represents one-third of the target mass, leaving too little mass available for the other elements of the hydrogen generation apparatus. Consequently, it is also a desideratum to develop an ammonia-based hydrogen generation apparatus that operates at temperatures less than 850° C.

A further challenge in providing a compact ammonia-based hydrogen generating apparatus for use with fuel cells and other applications is in selecting a reactor that achieves the desired compactness. One factor to be considered when evaluating a reactor is the residence time required to achieve desired conversion efficiency. Longer residence times require a larger reactor volume. To achieve a compact ammonia-based hydrogen generating apparatus, very short residence times are required to enable very small volume reactors to be employed. As the size of the reactor increases, so will its weight.

Conventional, large-scale hydrogen generation reactors often use packed-beds in which ammonia is passed through a heated vessel containing millimeter-sized pellets of catalyst materials. In many cases, the actual reaction rate in these reactors is considerably slower than the theoretically possible reaction rate (i.e., the rate expected based upon the intrinsic reaction kinetics) because of heat- and mass-transfer resistances. Therefore, it is also a desideratum to provide a reactor whose dimensions favor rapid heat and mass transfer, and short residence times.

Clearly it would be desirable to provide a compact ammonia-based hydrogen generating apparatus for use with fuel cells and other applications that operates at a relatively low temperature (i.e., from about 550° C. to about 650° C.), yet which does not require a significant volume of adsorbent to be employed to remove residual ammonia from the $H_2/N_2$ product, and which avoids the use of a packed bed reactor. The present invention satisfies these and other needs, and provides further related advantages.

SUMMARY OF THE INVENTION

Now in accordance with this invention there has been found a compact ammonia-based hydrogen generation apparatus for use with fuel cells and other applications. The hydrogen generation apparatus operates at a relatively low temperature, preferably from about 550° C. to about 650° C., more preferably from about 550° C. to about 580° C., yet which does not require a significant volume of adsorbent to be employed to remove residual ammonia. Furthermore, in preferred embodiments, the hydrogen generation apparatus does not employ a packed bed reactor.

In some embodiments, the hydrogen generation apparatus employs a thermocatalytic reactor that has a reaction chamber in a heat exchange relationship with a combustion chamber. In preferred embodiments, the reactor is formed of a top plate, a bottom plate, and a reactor core disposed between the top and bottom plates. The reactor core has a reaction surface and a combustion surface, each surface having a raised periphery defining opposing ends and opposing sides. The reaction surface and the top plate together define a reaction chamber and the combustion surface and the bottom plate together define a combustion chamber.

In addition, the reactor core has a first set of a plurality of spaced apart, radiating fins extending from the reaction surface and a second set of a plurality of spaced apart, radiating fins extending from the combustion surface. In some embodiments, at least one set of fins has a thickness of about 0.5 mm, a height of about 2 mm, and a length of about 50 mm and the spacing between adjacent fins is about 1 mm.

The first set of fins define a plurality of combustion channels, while the second set of fins define a plurality of reaction channels running parallel to the opposing sides and is spaced apart from the opposing ends. In some embodiments, the flow paths created by at least one of the sets of channels are straight. In alternative embodiments, the flow paths created by at least one of the sets of channels are zigzagged. And in some embodiments, a combustion catalyst, such as a platinum combustion catalyst, is disposed in the combustion chamber between the second end of the first set of fins.

It is an advantage of the invention that the reactor can be fabricated from a nonrefactory metal, such as titanium or stainless steel. It is another advantage of the invention that the reaction can be loaded with an ammonia decomposition catalyst having a light-off temperature below 600° C. Preferred catalysts include catalysts containing ruthenium or nickel. In some embodiments, the catalyst is packed in the reaction channels, while in alternative embodiments, the catalyst is coated on the internal surface of the flow channels in the reaction chamber.

In addition to the thermocatalytic reactor, the inventive hydrogen generation apparatus includes an ammonia supply, an ammonia supply line for transporting ammonia from the ammonia supply to the reactor, a reaction product supply line for transporting hydrogen from the reaction chamber, and a heat source operationally connected to the reactor. In some embodiments, one of the ammonia supply lines and the reaction product supply line enters the reactor core from the first opposing end and extends, parallel to the second set of fins, into the reactor core ending at a point adjacent the opposite end of the reactor, while the other terminates at the first opposing end. And in some embodiments, at least a portion of the reaction product supply line that is located outside of the reaction chamber is coaxially disposed outside of the ammonia supply line.

In some embodiments, the heat source is an ammonia combustor fluidly connected to the ammonia supply. In alternative embodiments, the heat source is an electrical heater, such as a battery or a fuel cell.

In another alternative embodiment, the heat source is a hydrocarbon combustor. In these embodiments, a combustion fluid supply line fluidly provides a combustible hydrocarbon, preferably butane, from a hydrocarbon supply to the combustion chamber and an exhaust line removes the combustion by-products from the combustion chamber. And in some of these embodiments, one of the combustion fluid line or the exhaust line enters the reactor core from the first opposing end and extends, parallel to the first set of fins, into the reactor core ending at a point adjacent the opposite end of the reactor, while the other terminates at the first opposing end.

In some embodiments, the hydrogen generation apparatus additionally includes an adsorbent supply connected to the reaction product supply line for removing residual ammonia from the hydrogen reaction product. In preferred embodiments, the adsorbent is an acid impregnated carbon adsorbent, more preferably an acid impregnated carbon adsorbent having from 2 millimoles of strong acid adsorption sites per gram of carbon to 5 millimoles of strong acid adsorption sites per gram of carbon.

Also in some embodiments, the ammonia supply line is made of a heat conducting material and passes through the adsorbent supply. And some embodiments include a second adsorbent supply connected to the reaction product supply line for removing residual ammonia from the hydrogen, along with a first valve for selectively directing ammonia from the ammonia supply to either the first or the second adsorbent supply and a second valve for selectively directing reaction products to either the first or the second adsorbent supply.

In some embodiments, the hydrocarbon generation apparatus includes a heat exchanger, preferably a counter flow heat exchanger, interposed in the hydrogen fluid line between the reactor and the adsorbent supply. In these embodiments, the ammonia supply line is made of a heat conductive material and passes through the heat exchanger. In referred embodiments, the heat exchanger is disposed in the combustion by-products exhaust line between the reactor and the adsorbent supply.

In accordance with the invention there has also been found a method for generating hydrogen. The method involves introducing the ammonia to the thermocatalytic hydrogen generation reactor, supplying heat to the thermocatalytic hydrogen generation apparatus, and then heating the ammonia in the reactor to a temperature of less than 850° C., preferably to a temperature between 550° and 650°, for a time sufficient to decompose the ammonia into hydrogen and nitrogen, and then removing the hydrogen-containing reaction product from the reactor.

In some embodiments, the ammonia is preheated, before the ammonia is introduced into the reactor. And in some embodiments, the reaction product contains residual ammonia and residual ammonia is removed by passing the reaction product through an adsorbent supply.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Particular embodiments of the invention are described below in considerable detail for the purpose of illustrating its principles and operation. However, various modifications may be made, and the scope of the invention is not limited to the exemplary embodiments described below.

Figure 1:
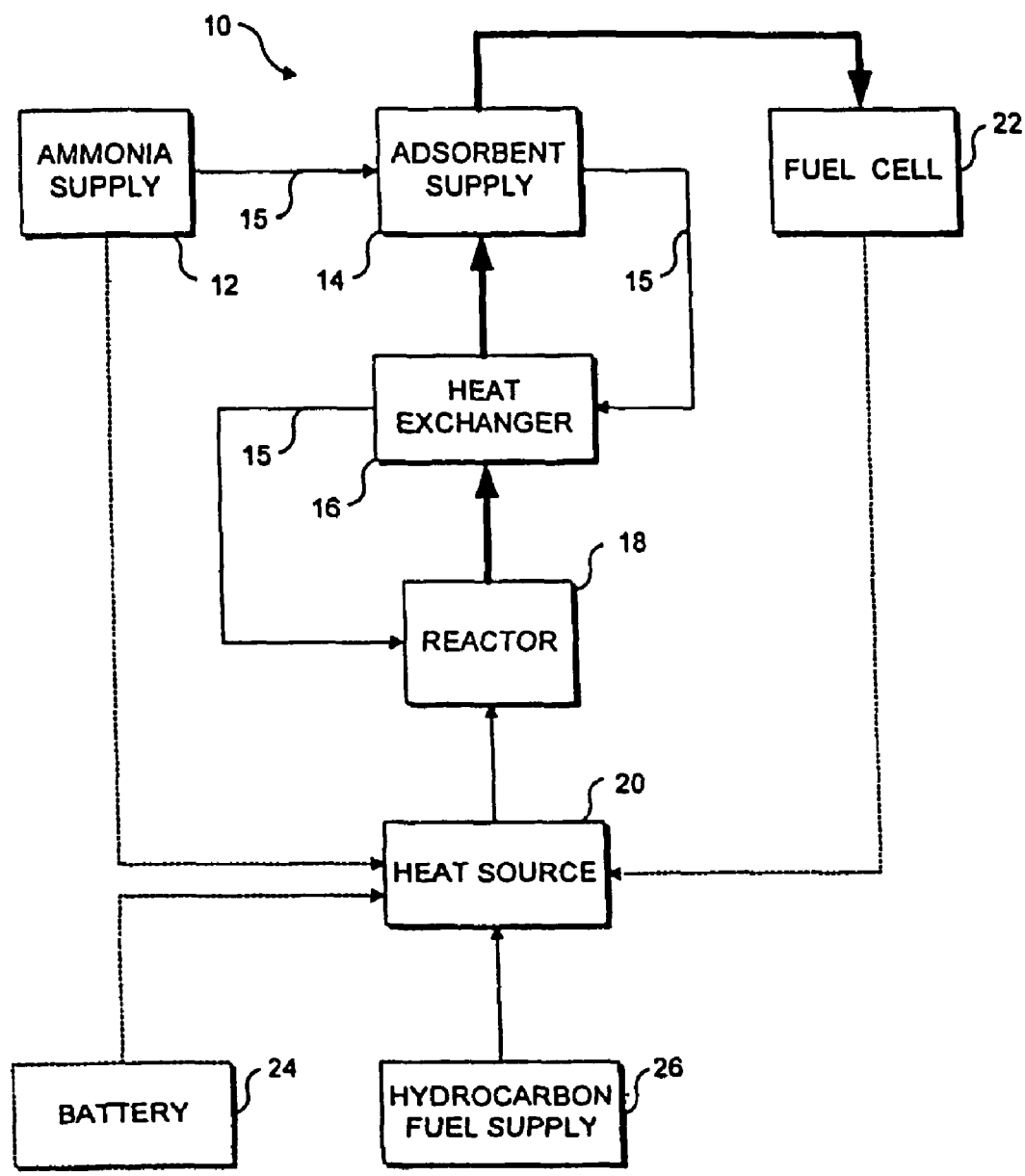
FIG. 1 is a block diagram illustrating the primary components used in the ammonia-based hydrogen generation apparatus of the present invention.

An exemplary ammonia-based hydrogen generation apparatus 10 shown in FIG. 1 includes an ammonia supply 12, an adsorbent supply 14, a heat exchanger 16, an ammonia dissociation reactor 18 containing a catalyst 86 (FIGS. 9 and 10), and a heat source 20. The embodiment shown in 1 also includes a fuel cell 22. However, fuel cell 22 is not a required component of an ammonia-based hydrogen generation apparatus.

The ammonia supply 12 is a pressure vessel containing liquefied ammonia. Those of ordinary skill in the art will appreciate that such pressure vessels are commonly employed and readily available. The ammonia can be liquefied by compression (114 pounds per square inch) and/or by cooling to about −33° C. The ammonia supply provides a sufficient quantity of liquid ammonia to ensure that performance goals are achieved over the intended period of operation between replenishment of the ammonia supply.

Heat source 20 provides sufficient thermal energy to bring reactor 18 up to the temperature required to support the reaction. The amount of heat required is a function of the volume of ammonia, the size of the reactor, and the specific catalyst that is employed. Any suitable heat source can be employed. For example, heat can be provided electrically, by combustion of a fuel external to the reactor, or by combustion of a fraction of the ammonia inside the reactor (i.e., by auto thermal heating).

In one preferred embodiment, the heat source 20 is a hydrocarbon-based combustor that generates thermal energy by combustion of a hydrocarbon gas provided from a hydrocarbon fuel supply 26. In a preferred hydrogen generation apparatus, the hydrocarbon fuel is butane.

Alternatively, the reactor 18 can be electrically heated, in which case the heat source 20 comprises an electric heater, energized initially by an optional battery 24. Once the reactor is generating hydrogen, the fuel cell 22 can be used to provide the electrical energy needed to further energize the heat source 20. However, this approach imposes a significant electrical power burden on the fuel cell. For a 50-watt H/AFC, roughly 40% of the fuel cell output power must be returned to the reactor to maintain a constant reactor temperature. Thus, a user will only be provided a net 30 W of power from the 50 W fuel cell, because some of the electrical energy provided by fuel cell 22 is used to generate the hydrogen fuel in the fuel cell. For extremely compact ammonia-based hydrogen generation apparatuses, electric heat is not preferred, because the required battery adds an excessive additional mass and weight to the hydrogen generation apparatus.

For embodiments of the present invention that are not limited by the available ammonia supply, autothermal heating can be employed to provide the heat necessary to drive hydrogen generation. In such embodiments, the heat source 20 comprises an ammonia combustor in which ammonia from the ammonia supply 12 is combusted to provide the thermal energy to the reactor 18.

Autothermal heating requires that the reactor and catalyst must be pre-heated to achieve a temperature required to sustain the auto thermal reaction (the light off temperature of the catalyst being employed). Such pre-heating can be achieved by using a relatively small hydrocarbon fuel supply, a relatively small battery, or enabling the air/ammonia ratio to be varied, i.e., in a start up phase, more air is provided to support normal ammonia combustion. Once the catalyst and reactor are heated above the light off temperature of the catalyst, the amount of air being provided is reduced, and auto thermal heating is enabled.

While such an embodiment reduces the need for an additional hydrocarbon fuel supply or a battery, ammonia which could be disassociated into hydrogen is instead used in the combustion process to provide energy to drive the desired reaction. Thus, in such an embodiment, an additional volume of ammonia must be provided to supply the required thermal energy. Furthermore, a method (such as an adsorbent bed) to clean-up trace ammonia leaving the combustor must also be incorporated.

From the perspective of total apparatus mass, fuel combustion is superior to electric heating. Hydrocarbon fuels have an energy density nearly one hundred times that of conventional alkaline batteries. The energy density of ammonia is only about half that of hydrocarbon fuel. If heat is provided by combustion of a fuel, significantly more fuel mass is required when ammonia is burned as compared to a hydrocarbon such as butane.

The weight savings of using hydrocarbon fuel are partially offset by the requirement for a separate hydrocarbon fuel tank. However, the vapor pressure of butane fuel is relatively low so a very lightweight tank can be safely used. In addition to the weight savings of using butane rather than ammonia, butane is preferred because butane/air flames are easy to ignite and control. Thus, in embodiments in which compactness is critical, combustion of butane represents a preferred method of the heating reactor 18.

FIGS. 3-6 illustrate one embodiment of a reactor of especial use in a miniaturized hydrogen generation apparatus. The reactor is 2 cm wide, 7 cm long, 1 cm high, and has a reactor volume (the volume of reaction chamber) of about 3 cm$^3$. However, the reactor can be scaled up to a larger size capable of generating hydrogen for larger ammonia-based hydrogen generation apparatuses. Similarly, the reactor can be employed in apparatuses using larger ammonia and fuel supplies, to achieve an ammonia-based hydrogen generation apparatus that can provide modest volumes of hydrogen to a fuel cell for extended periods of time. Such a apparatus is useful in remote applications, such as marine buoys. It is an advantage of the reactor that it is operated at temperatures less than 850° C., preferably at temperatures between 550° and 650°, and more preferably at temperatures between 550° and 580°. Consequently, the reactor can be fabricated from a variety of nonrefactory metals, such as metal alloys, having good thermal conductivity. Representative metals include titanium and stainless steel.

The reactor 60 includes a top plate 62, a bottom plate 66, and a reactor core 64, disposed between the top and bottom plates. The reactor core includes a reaction surface 64a, and a combustion surface 64b, both surfaces having a raised periphery defining opposing ends 61a and 61b and opposing sides 63a and 63b. The reaction surface and the top plate together define a reaction chamber, while the combustion surface and the bottom plate together define a combustion chamber. The top plate, the bottom plate, the reactor core are attached to one another by any suitable method, such as brazing or laser welding. In preferred embodiments, the reactor 18 is surrounded by an insulating elements, to minimize heat loss to the ambient environment.

A plurality of spaced apart, substantially straight radiating fins 76a extend upwardly from a center of the reactor core 64 on the reaction surface 64a, while a plurality of spaced apart, substantially straight radiating fins 76b depend downwardly on the combustion surface 64b. Preferably the fins have a thickness of about 0.5 mm, a height of about 2 mm and a length of about 50 mm. The spacing between the adjacent fins is preferably about 1 mm. The fins define a plurality of combustion channels 69 and a plurality of reaction channels 71 running parallel to the opposing sides 63a and 63b and spaced apart from opposing ends 61a and 61b.

Butane enters the combustion chamber via a combustion fluid line 68 in fluid communication with the combustion chamber and is distributed throughout the combustion channels 69. The combustion products exit through an exhaust fluid line 70. Air must be provided along with the butane fuel to support combustion of the butane. Preferably, the air is premixed with the butane before the butane enters the combustion chamber. In a preferred embodiment, a venturi (not separately shown) integral with valve 52 mixes ambient air with butane from butane supply 50 (see FIG. 2). Alternatively, a separate air pump can be included, to supply air through an air line (not shown) that merges with butane fluid line prior to where it enters the combustion chamber.

In some embodiments, the air/butane mixture is preheated using waste heat from the hot combustion product gases before the air/butane mixture is introduced into the combustion chamber. For example, a tube-in-tube heat exchanger (not shown), in which the butane/air supply line is disposed within the exhaust fluid line can be employed to raise the temperature of the butane/air mixture prior to its combustion. However, care must be taken to prevent excessive preheating, as the auto-ignition temperature (i.e., the temperature at which the air/butane mixture will combust without requiring a spark for ignition) is 430° C.

Figure 6:
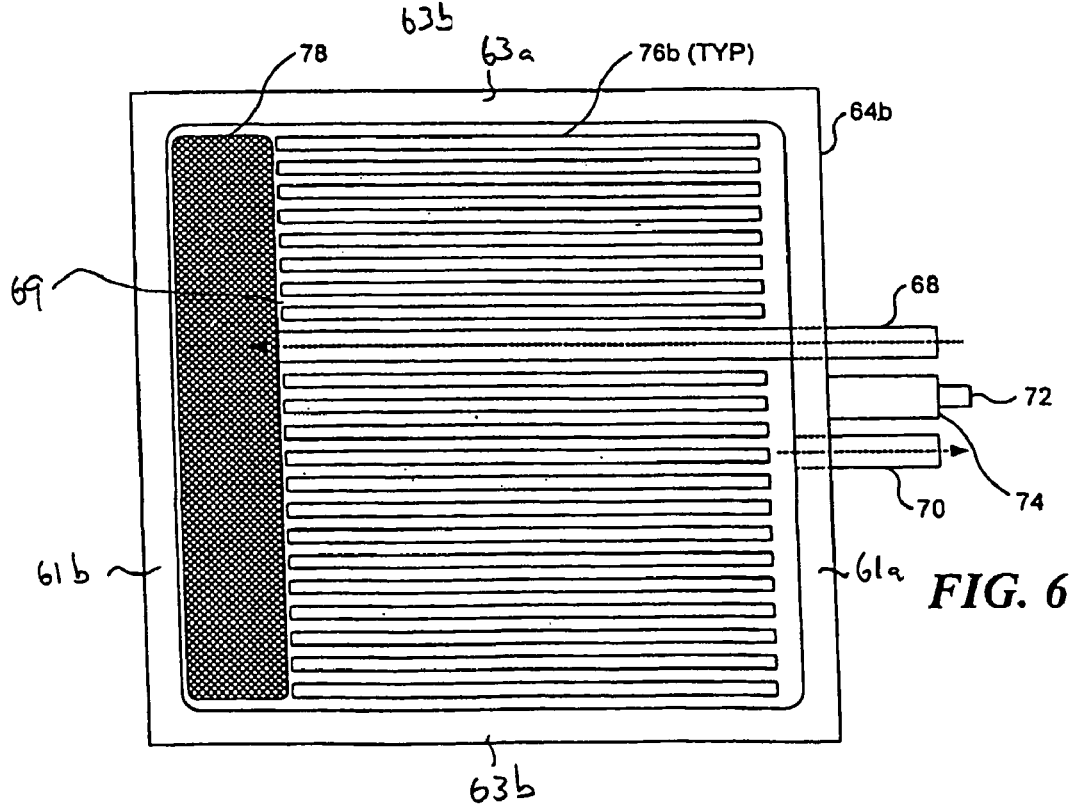
FIG. 6 is a bottom plan view of the reactor core section of the reactor of FIG. 3.

As best seen in FIG. 6, the combustion fluid line 68 enters the reactor core 64 from the first opposing end 61a and extends, parallel to the fins 76b, into the reactor core up to a point adjacent the opposite end of the reactor core 61b. The fins are not disposed immediately adjacent to the combustion fluid line, enabling the combustion fluid line to traverse the reactor core, so that the butane enters the combustion chamber at a different point than where combustion products exit the chamber, thus ensuring that the butane is free to traverse the length of the combustion chamber. This arrangement minimizes the likelihood that uncombusted butane exits the reactor, and maximizes the length of time that hot combustion gases are exchanging thermal energy with the fins.

In the embodiment shown in FIGS. 3-6, upon exiting the combustion fluid line 68, the butane contacts a platinum gauze catalyst 78, disposed in the combustion chamber between the second end 61b, the fins 76b and the end of the combustion fluid line. Typically, the gauze has a mesh of from about 20 to about 80, with a mesh of about 52 mesh being preferred.

The butane is then combusted. The platinum catalyzed combustion occurring at platinum gauze 78 generates hot combustion gases that are directed along the combustion channels 69 toward the exhaust fluid line 70 at the opposite end of the combustion chamber. During the time required for the hot gases to reach the exhaust fluid line, fins 76b absorb a significant amount of thermal energy, which is then transferred to fins 76a in the reaction side portion of reactor core 64. Heat from the combustion side 64b is absorbed by the fins 76b, which are in a heat exchange relationship with the corresponding fins 76a. The heat transferred by these fins ensures that ammonia is sufficiently heated so the desired disassociation reaction occurs. The channeled flow path created by the fins also decreases the pressure drop across the combustor and permits the use of lightweight air blowers to supply air for combustion.

Combustion by-products exit the combustion chamber via an exhaust fluid line 70. By utilizing the catalyst and the fins 76a and 76b, greater than 90% of the available combustion energy can be extracted from combustion of the butane and transferred to the reaction chamber.

Ammonia flows into the reaction chamber via an ammonia supply line 72, and the thermal energy provided by the combustion of butane causes the ammonia to disassociate into hydrogen and nitrogen. The hydrogen and nitrogen thus produced exit the reactor via a reaction product supply line 74.

Figure 4:
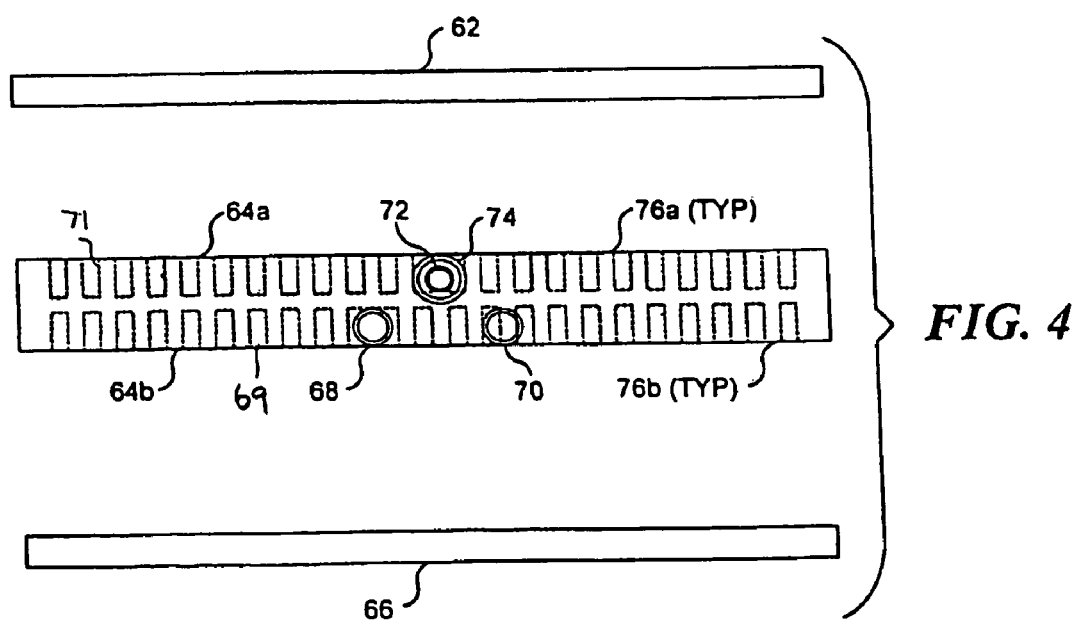
FIG. 4 is an exploded front elevational view of the reactor of FIG. 3, with interior details shown in phantom.
Figure 5:
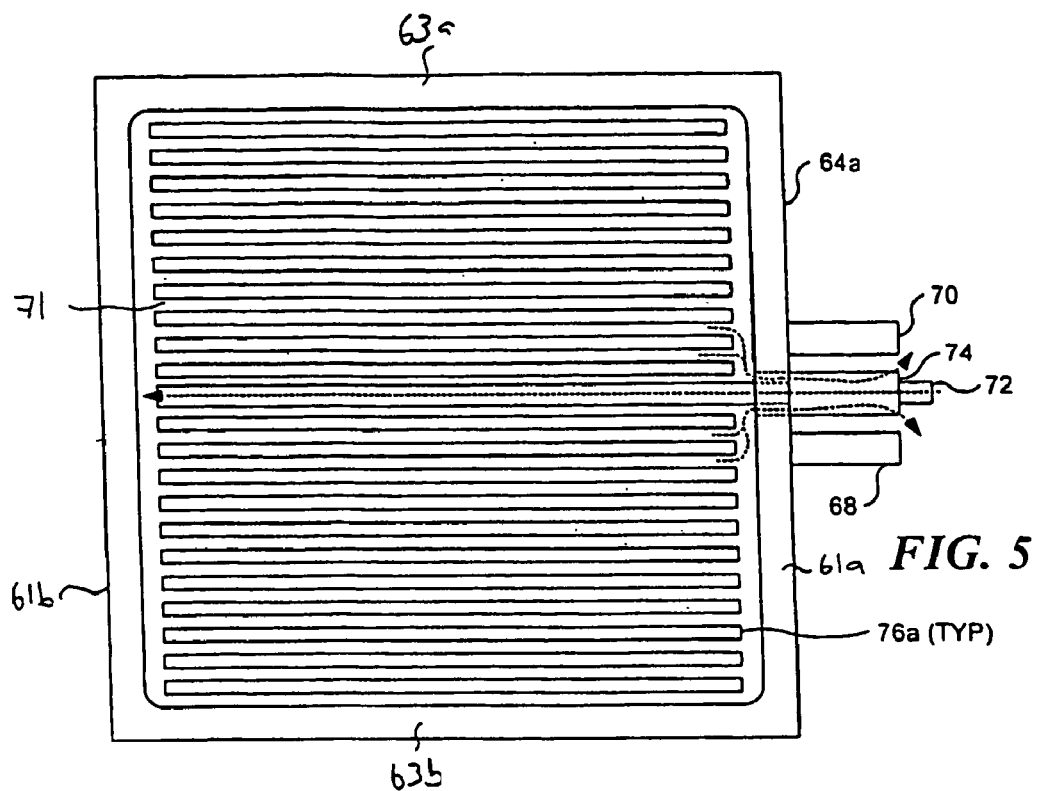
FIG. 5 is a top plan view of the reactor core section of the reactor of FIG. 3.

The flow paths of the ammonia entering reaction chamber and the hydrogen/nitrogen product exiting the reaction chamber are shown in FIG. 5. The ammonia supply line 72 enters the reactor core 64 from the first opposing end 61a and extends, parallel to the fins 76a, into the reactor core up to a point adjacent the opposite end of the reactor core 61b. As best seen in FIG. 4, the fins are not disposed immediately adjacent to the ammonia supply line or the reaction product supply line 74, enabling the ammonia supply line to traverse the reactor core, so that the ammonia enters the reaction chamber at a different point than where the hydrogen/nitrogen product exits the chamber. By disposing the outlet of the ammonia supply line on the opposite side of the reactor core from the reaction product supply line, the ammonia must traverse the length of the reaction chamber before it can exit the reactor core. This configuration ensures sufficient residence time for all but a trace of the ammonia to be disassociated into the desired hydrogen/nitrogen product.

In the embodiment shown in FIGS. 3-6, at least a portion of the reaction product fluid located outside of the reaction chamber line 74 is coaxially disposed outside of the ammonia supply line 72, creating a counter-flow heat exchange relationship between the reaction product supply line and the ammonia supply line. The hot hydrogen and nitrogen product exiting the reactor via the reaction product supply line heats the relatively cool ammonia flowing through the ammonia supply line. By adding thermal energy to the ammonia before the ammonia enters the reaction chamber, less thermal energy is required from combustion of the butane on the combustion side of reactor core 64.

Figure 7:
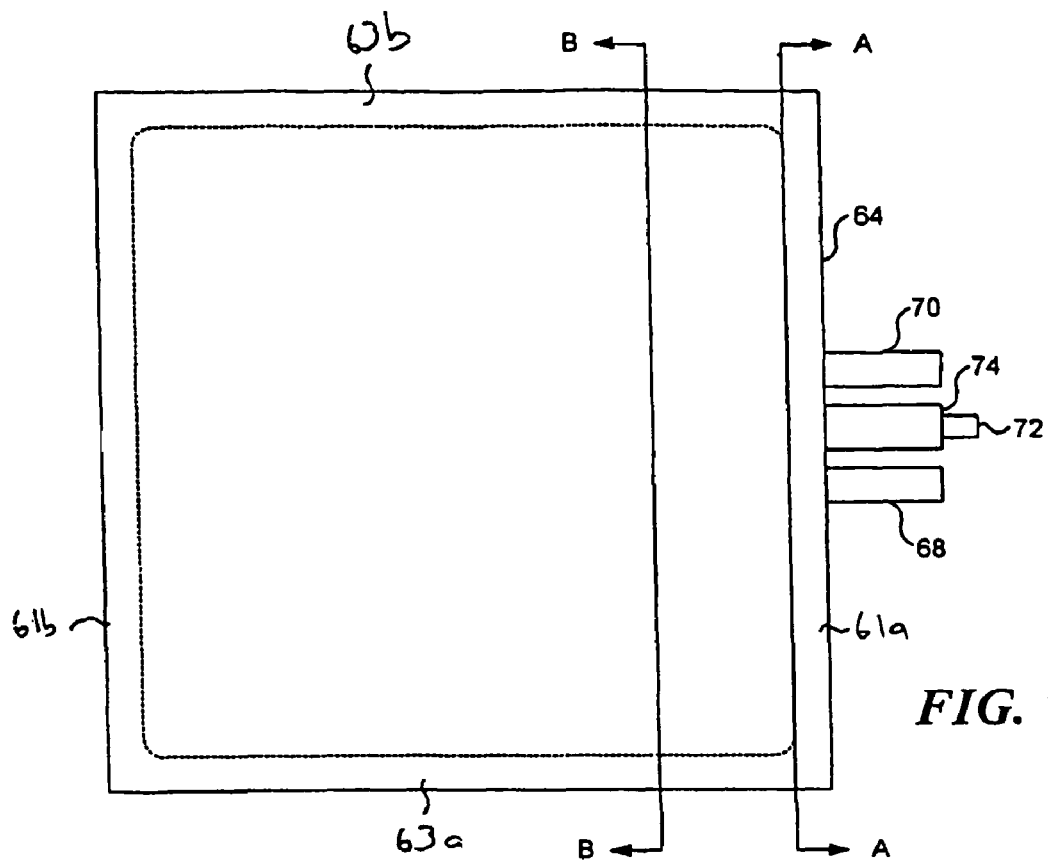
FIG. 7 is a top plan view of the reactor of FIG. 3.
Figure 8A:
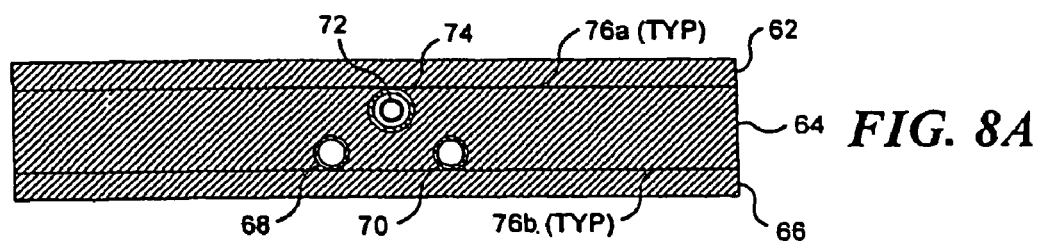
FIG. 8A is a cross-sectional view of the reactor of FIG. 3, taken along section lines A-A of FIG. 7.
Figure 8B:
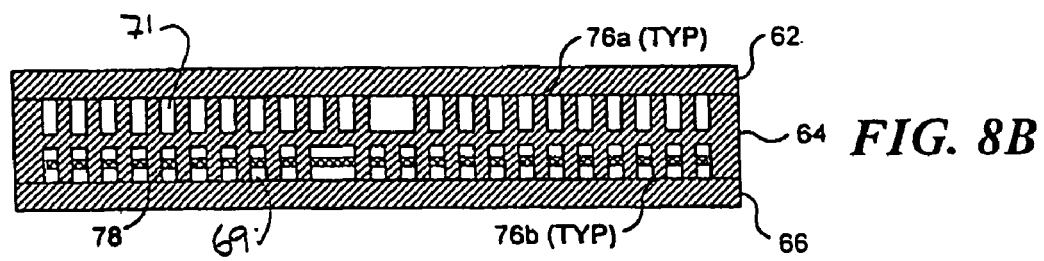
FIG. 8B is a cross-sectional view of the reactor of FIG. 3, taken along section lines B-B of FIG. 7.

FIGS. 7, 8A, and 8B illustrate the assembled reactor 60. Shown are the butane fluid line 68, the exhaust fluid line 70, the ammonia supply line 72, the hydrogen fluid line 74, the fins 76a and 76b, and the platinum gauze 78 catalyst.

The reactor is loaded with any suitable ammonia decomposition catalyst. The particular catalyst used is selected based on the operating temperature of the reactor. In a preferred embodiment, the apparatus operates at temperatures of from about 550° C. to about 650° C., most preferably from about 550° C. to about 580° C. These temperatures enables standard construction materials to be used in fabricating the reactor. While higher temperature reactors are slightly more efficient in converting ammonia into hydrogen and nitrogen, such reactors, which operate at temperatures in excess of 850° C., must be fabricated of exotic materials, such as refractory metals.

Different types of catalysts are available for this purpose, and the characteristics of specific catalysts (and any required catalyst support, such as alumina) affect the design of the reactor. Preferably, the catalyst has a light-off temperature of below 600° C., and an optimum operating temperature of less than 650° C. While such temperature conditions result in a conversion efficiency that is lower than can be obtained by catalysts that operate at higher temperatures, the lower preferred temperature conditions noted above enable standard materials, such as titanium and stainless steel to be employed in fabricating the reactor 18.

Specific catalysts also have characteristic activities, which influence the size of the reactor. For example, for a given volume, different catalysts will require different flow rates to achieve the same conversion efficiency. Similarly, for a given flow rate, different catalysts will require different reactor volumes to achieve the same conversion efficiency. Thus, the catalyst selected will influence optimal temperature conditions, flow rates, and reactor volumes. Preferred catalysts include ruthenium-based catalysts, often provided as ruthenium dispersed in an aluminum oxide support matrix, such as Type 146, available from Johnson Matthey. However, because the reactor operates at temperature is less than 650° C., other very high surface area catalyst support matrices, such as gamma alumina and nanophase titania can be employed. Therefore, it is an advantage of the invention, that ruthenium catalysts dispersed in either a gamma alumina or nanophase titania matrix can be used.

If autothermal heating is employed, then some oxygen needs to be included with the ammonia to support the combustion. Oxygen negatively affects certain catalysts, e.g., ruthenium-based catalysts. Accordingly, for apparatuses employing autothermal heating, a catalyst more resistant to oxidation may be required. In addition, since ammonia and the water produced by combustion form a corrosive mixture, corrosion resistant materials should be used, instead of stainless steel.

Moreover, when assembling reactors containing oxygen-sensitive catalysts (i.e., by brazing the top cover to the reactor core) it may be beneficial to provide a reducing atmosphere in order to prevent the catalysts from oxidizing.

Nickel-based catalysts, such as Katalco 27-7™, available from ICI/Katalco of the UK) are also preferred catalysts. However, the nickel catalyst requires a longer residence time than the ruthenium catalyst to achieve similar conversion efficiency. The ruthenium catalyst has a residence time that is approximately one-tenth that of the nickel catalyst.

Other suitable catalysts include iron oxide, rhodium, and rhenium catalysts.

Due to the efficiency of carbon-based adsorbents in removing residual ammonia from a hydrogen/nitrogen mixture, reactor 18 preferably converts at least 99.9% of the ammonia into hydrogen and nitrogen, so that the reaction product includes less than 1000 ppm of residual ammonia.

In the embodiment shown in FIG. 1, after exiting the reactor 18, the hot nitrogen and hydrogen mixture, flow into the heat exchanger 16, where the much cooler ammonia (flowing from ammonia supply 12 to reactor 18 through ammonia supply line 15) absorbs thermal energy from the hotter nitrogen and hydrogen exiting the reactor. Preferably, a counter-flow-type heat exchanger is employed, and in one embodiment, the heat exchanger comprises a tube-in-tube type. In preferred embodiments, the heat exchanger is surrounded by an insulating element, to minimize heat loss to the ambient environment.

The purpose behind providing a heat exchange relationship between the ammonia flowing from ammonia supply 12 to reactor 18 and the adsorbent contained within adsorbent supply 14 is two-fold. First, preheating the ammonia, before it enters the reactor is important in enabling an energy efficient hydrogen generation apparatus. Without the heat exchanger, a significant amount of energy would be lost by not recovering the energy from the hot hydrogen/nitrogen mixture exiting the reactor. Such a heat loss would require the consumption of more fuel to heat the reactor, thus increasing the apparatus's size, weight, and operational costs. Second, cooling the hydrogen/nitrogen mixture before it enters the adsorbent supply increases the effectiveness of the adsorbent by minimizing or eliminating the adsorbent's accumulation of thermal energy from the hydrogen/nitrogen mixture. Preferably, heat exchanger 16 reduces the temperature of the hydrogen/nitrogen product to below about 80° C., and even more preferably, to near ambient temperature.

The cooled hydrogen/nitrogen product exits the heat exchanger 16 and flows into the adsorbent supply 14, where the adsorbent adsorbs any residual ammonia contained within the hydrogen and nitrogen exiting reactor 18. A sufficient amount of adsorbent is supplied to ensure that performance goals are achieved over the intended period of operation between replenishment of the adsorbent. Preferably, the adsorbent within the adsorbent supply removes substantially all (leaving less than 1 ppm) of the residual ammonia from the hydrogen/nitrogen product.

Preferred adsorbents include carbon and modified carbon adsorbents. Most preferred adsorbents include carbon whose surface has been impregnated to include bound acid molecules. The acid thus bound neutralizes the residual ammonia. At a minimum, the most preferred adsorbent has 2 millimoles of strong acid adsorption sites per gram of carbon, and the most preferred adsorbent can have up to 5 millimoles per gram of carbon.

Liquid ammonia passes through adsorbent supply 14 via the ammonia supply line 15. The ammonia supply line passes through the adsorbent, such that an exchange of thermal energy occurs between the ammonia flowing within the ammonia supply line and the adsorbent. The ammonia is not filtered by the adsorbent, as the ammonia remains in the fluid line and does not come in contact with the adsorbent.

While in the adsorbent supply 14, at least a portion of the liquid ammonia returns to its gaseous state and absorbs substantial amounts of heat from the surrounding adsorbent (i.e., one gram of ammonia absorbs 327 calories of heat). In this manner, the ammonia from the ammonia supply cools the adsorbent contained within the adsorbent supply, thus maintaining the efficiency of the temperature-sensitive adsorbents. Upon exiting the adsorbent supply, ammonia supply line 15 is coupled in fluid communication with heat exchanger 16, so that the hot hydrogen and nitrogen gas exiting the reactor 18 exchanges thermal energy with the much cooler ammonia gas, cooling the hydrogen/nitrogen gas mixture and increasing the temperature of the ammonia.

Figure 2:
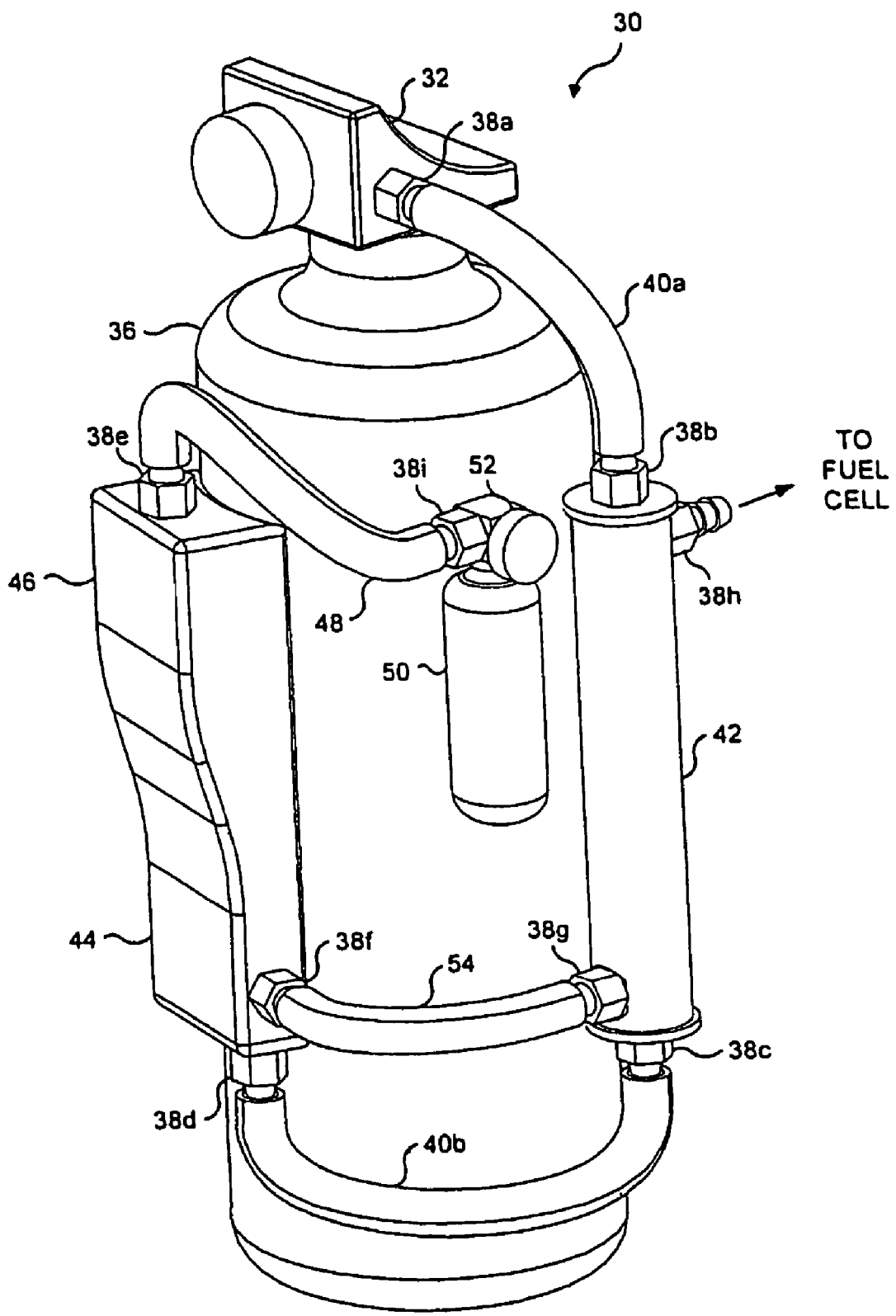
FIG. 2 is an isometric view of a preferred embodiment of an ammonia-based hydrogen generation apparatus of the present invention.
Figure 3:
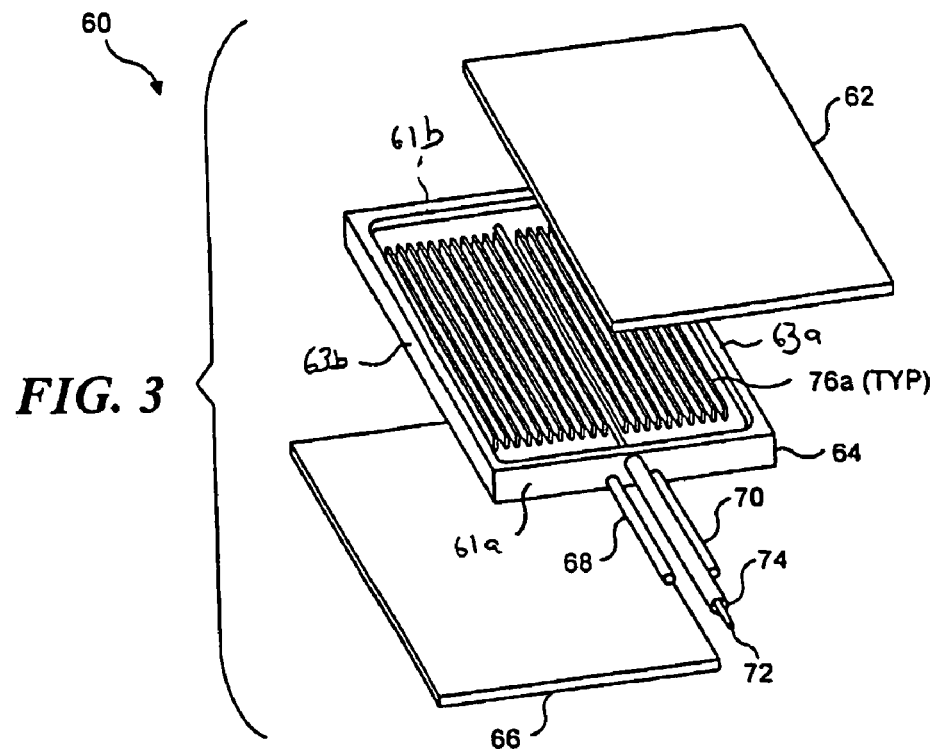
FIG. 3 is an exploded view of a hydrogen generation reactor in accordance with the present invention.

The functional elements of hydrogen generation apparatus 10 discussed in FIG. 1 are assembled into a preferred compact embodiment shown in FIG. 2. Preferably, miniature hydrogen generation apparatus 30 is less than 1 liter in volume, less than 1 kg in mass, and provides sufficient hydrogen fuel to generate up to 50 Watts of electrical power, with a total energy output of 1 kWh.

A pressure regulator 32 is attached to a liquid ammonia supply 36. In order to minimize the weight of the ammonia supply, a lightweight, yet strong material, such as a titanium alloy is used. To provide storage for 333 g of ammonia, the ammonia supply is approximately 600 ml in volume. The mass of a titanium based vessel 600 ml in volume is approximately 84 g. Thus, the ammonia and supply tank accounts for 417 g of the target mass of 1000 g.

An ammonia supply line 40 is attached to a fluid fitting 38a on the pressure regulator 32, and a fluid fitting 38b is attached to an adsorbent canister 42. Liquefied ammonia flows into an adsorbent canister 42 containing approximately 30 g adsorbent, cooling the adsorbent contained therein. The hot hydrogen/nitrogen mixture exiting a reactor 46 is in fluid communication with the adsorbent in the adsorbent canister. The relatively cold ammonia absorbs some of the thermal energy of the adsorbent, heating the ammonia and cooling the adsorbent to ensure that the adsorbent is performing optimally. The mass of the adsorbent canister (without the adsorbent) is approximately 15 g. The mass of the ammonia storage tank, the ammonia itself, the adsorbent column, and the adsorbent portion of miniature hydrogen generation apparatus 30 is 462 g (excluding fittings and tubing).

The ammonia exits the adsorbent canister 42 through a fluid fitting 38c, and flows through an ammonia supply line 40b into a heat exchanger 44. The ammonia enters the heat exchanger via a fluid fitting 38d. While the details of the heat exchanger are obscured by a housing containing both the heat exchanger and a reactor 46, the heat exchanger is a counter-flow heat exchanger that enables the ammonia entering the heat exchanger to exchange thermal energy with hot hydrogen and nitrogen gas exiting the reactor 30. Preferably, the heat exchanger is a tube-in-tube heat exchanger having a mass of approximately 30 g. In one embodiment, the heat exchanger is approximately fifteen centimeters in length. In some embodiments, a coiled tube-in-tube heat exchanger configuration is employed to reduce the length of the heat exchanger.

The heat exchanger 44 further increases the temperature of the ammonia before the ammonia enters the reactor 46. The pre-heated ammonia then enters reactor, where additional thermal energy is provided by a hydrocarbon combustor (or other heat source) disposed within reactor. Sufficient thermal energy is provided to bring to the reactor to and maintain the reactor at its operating temperature. Butane is provided in a relatively lightweight pressurized container 50. A pressure regulator 52 controls the flow of butane into the reactor.

Air must be mixed with the butane fuel to support combustion. While a separate air pump and air lines (not shown) can be incorporated into miniature hydrogen generation apparatus 30, preferably, the pressure regulator 52 not only meters the flow of the butane fuel, but also mixes ambient air with the butane to provide the proper fuel/air mixture required for combustion to occur. Butane exits butane the container 50 via the pressure regulator and the fluid fitting 38i, and flows into a butane fluid line 48. The butane fluid line is in fluid communication with a fluid fitting 38e, and at that point, the butane enters reactor 46, where it is combusted to provide the required thermal energy.

In some embodiments, the butane or other hydrogen gas flows through a critical orifice (not shown) to create a critical flow before the gas enters the reactor. A critical flow is achieved when the velocity of the gas in the orifice equals the speed of sound in that particular gas. Achieving a critical flow is useful, because a very nearly constant gas flow can be maintained, despite fluctuations in the downstream pressure, provided the upstream pressure is constant and the ratio of downstream pressure to upstream pressure is less than a "critical ratio." The critical ratio for many common gases is about 0.5, and can be estimated based on thermodynamic principles. Using air as an example, if the upstream pressure is 20 PSIG (34.7 PSIA), then as long as the downstream pressure is less than about 2.7 PSIG (17.4 PSIA, which is equal to 34.7 PSIA multiplied by the 0.5 critical ratio), the gas flow will be constant.

Approximately 40 g of butane are required to provide sufficient heat to disassociate the 333 g of ammonia. The butane container 50 has a mass of approximately 30 g, while the regulator/air mixer has a mass less than 20 g. The mass of the required fitting and tubing is approximately 80 g. In those embodiments where the heat source is a hydrocarbon fuel, such as butane, the fuel entering reactor 46 must be ignited for combustion to be initiated, for example, with a piezoelectric igniter (not shown). The mass of such an igniter is approximately 20 g.

Preferably, reactor 46 is fabricated from a lightweight material. Titanium is lightweight and can withstand the required temperatures. To minimize mass, a preferred insulation material used to substantially enclose the reactor is vacuum formed aerogel panels. The titanium reactor, including the catalyst, has a mass of approximately 50 g, and the housing and insulation for the heat exchanger and reactor have a mass of approximately 110 g.

The hot hydrogen and nitrogen mixture exit reactor 46 via the heat exchanger 44, flowing through a fluid fitting 38$f$ into a reaction product supply line 54, which is connected to the adsorbent canister 42 via a fluid fitting 38$g$. As the hydrogen and nitrogen gas mixture enters the adsorbent canister, residual ammonia is removed. Thus, ammonia-free hydrogen is discharged from the adsorbent canister via a fluid fitting 38$h$.

The mass of the fitting and tubing is approximately 80 g, resulting in a total apparatus mass of 842 g. The masses described in conjunction with FIG. 2 are merely exemplary, and miniaturized hydrogen generation apparatuses, having volumes other than 1 L and capacities of more than or less than the 50 watt/1 kWh, can be achieved by increasing or decreasing the size and mass of the components of miniaturized hydrogen generation apparatus 30.

TABLE 1

Component Masses for 1 kWh Apparatus

| Component | Mass |
|---|---|
| Ammonia liquid | 333 g |
| Ammonia storage tank | 80 g |
| reactor (titanium) | 50 g |
| tube-in-tube heat exchanger | 30 g |
| Aerogel insulation | 10 g |
| Ammonia adsorbent | 30 g |
| Adsorbent bed canister | 15 g |
| butane canister | 30 g |
| butane sufficient for 1000 W-h | 40 g |
| butane combustor/igniter | 20 g |
| flow control critical-flow orifice | 20 g |
| Housing and support structure | 100 g |
| valves and tubing | 80 g |
| TOTAL | 837 g |

Figure 9:
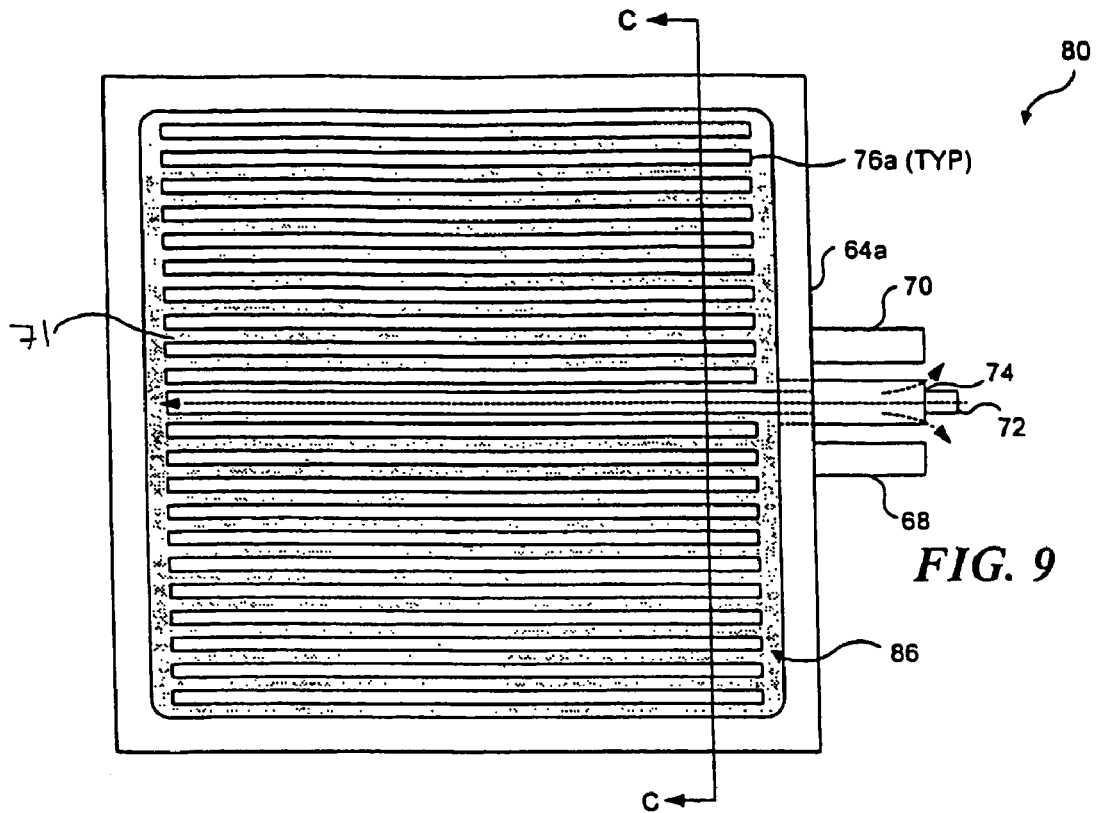
FIG. 9 is a top plan view of a reactor showing a first catalyst embodiment.
Figure 10:
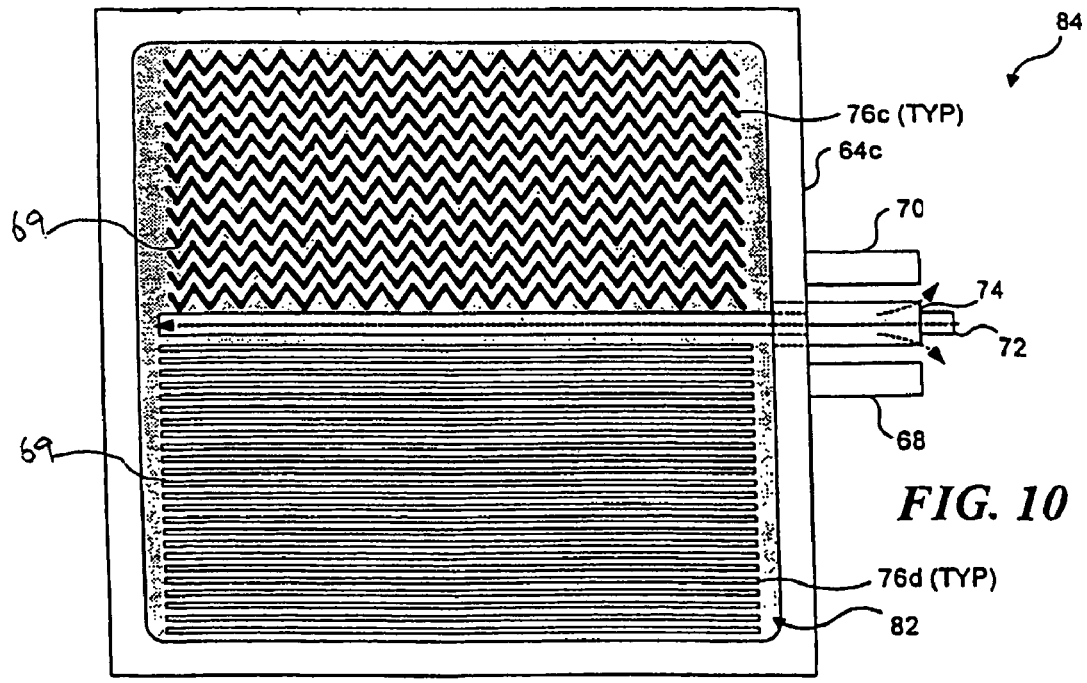
FIG. 10 is a top plan view of a reactor core section showing a second catalyst embodiment.
Figure 11:
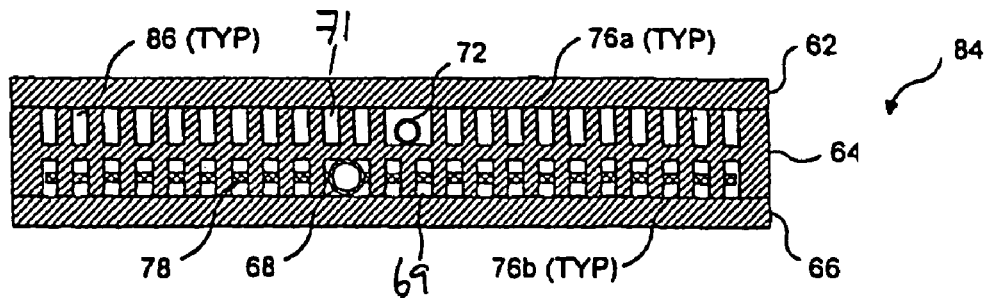
FIG. 11 is a cross-sectional view of the reactor of FIG. 9, taken along section lines C-C of FIG. 9.
Figure 12:
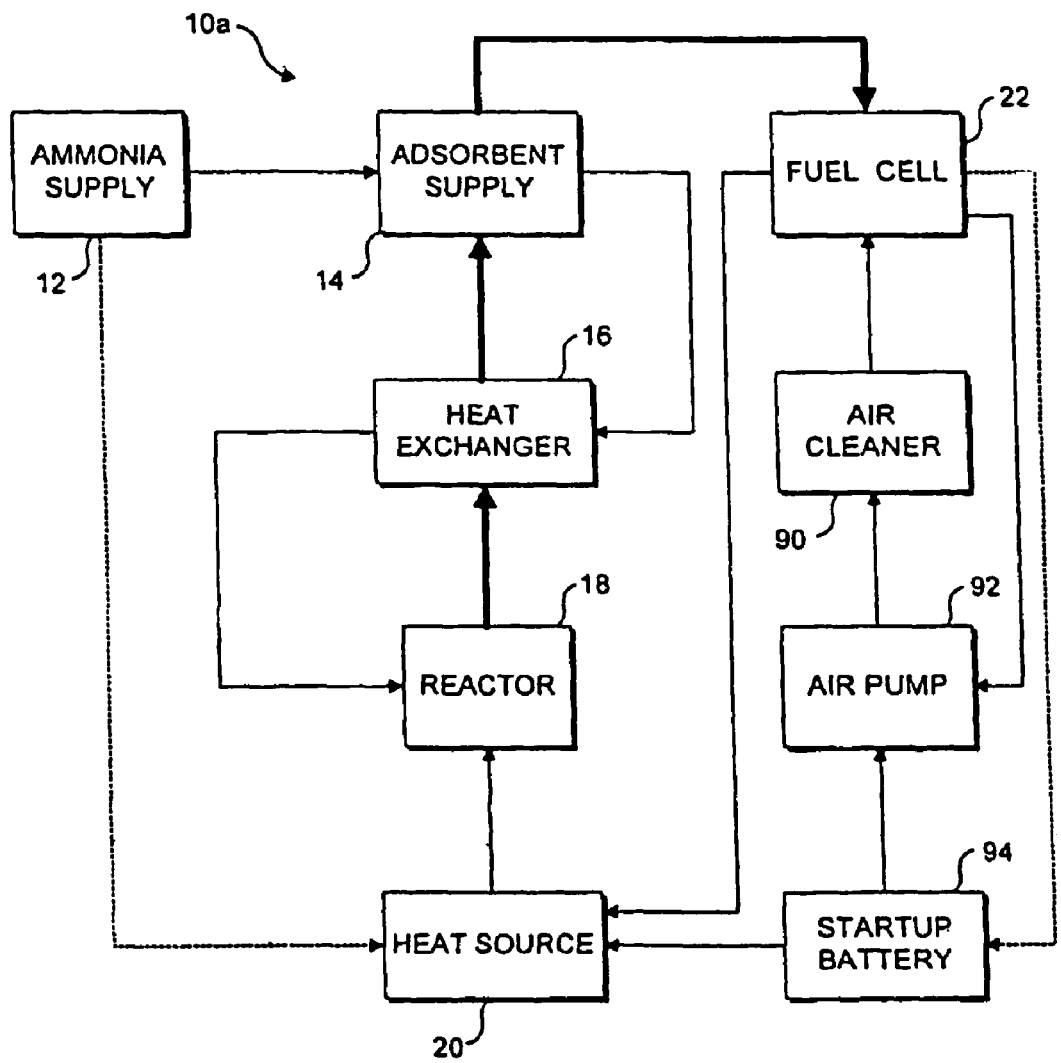
FIG. 12 is a block diagram illustrating the primary components used in an alternative embodiment of an ammonia-based hydrogen generation apparatus.
Figure 13:
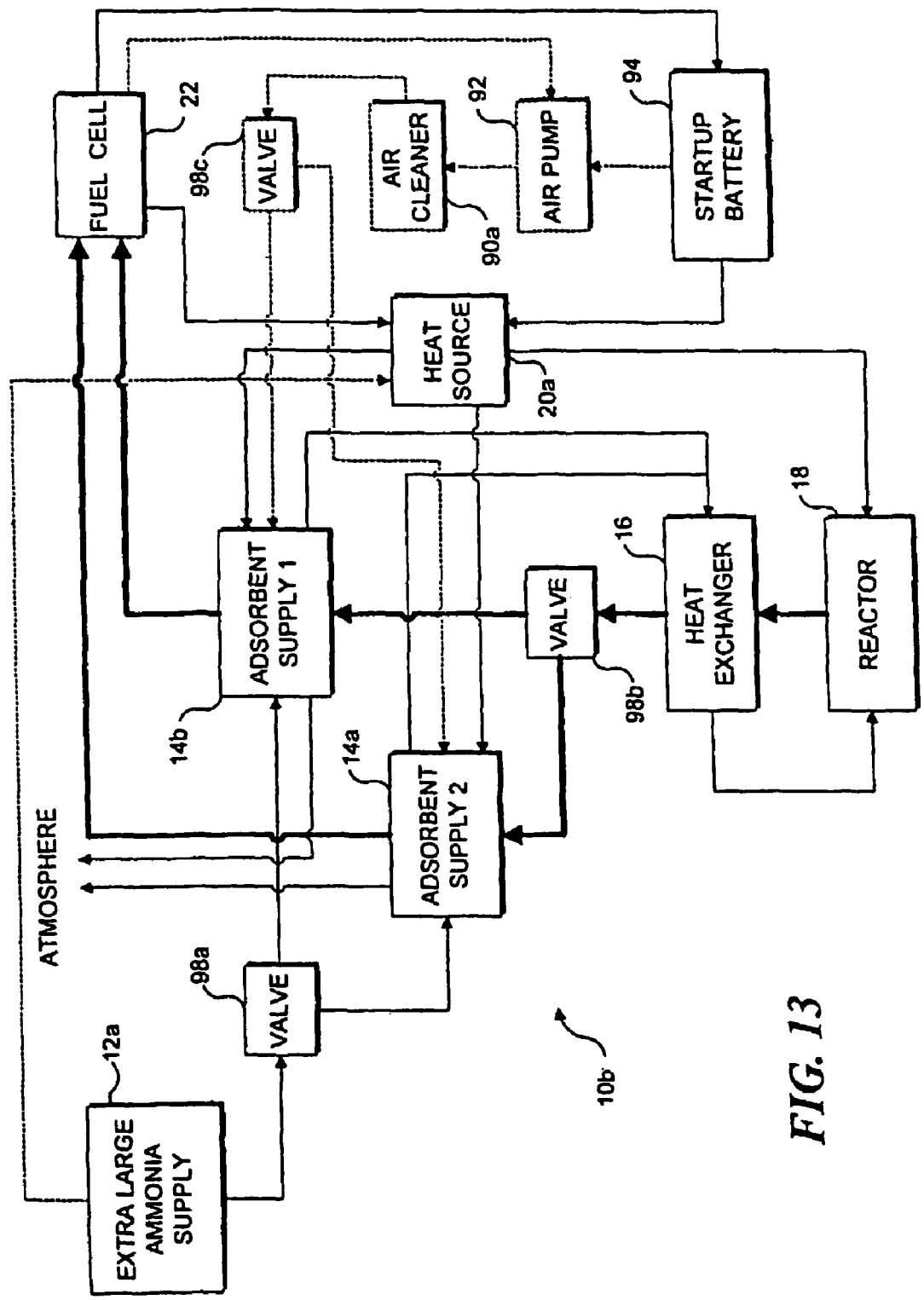
FIG. 13 is a block diagram illustrating the primary components of another alternative embodiment of an ammonia-based hydrogen generation apparatus.

In the embodiment shown in FIGS. 9 and 10, a catalyst 86 is packed in the reaction channels. In the two alternative embodiments shown in FIG. 11, the fins in the reaction chamber are coated with the catalyst. To maximize the coated surface area, in one of the alternative embodiments, the fins 76$c$ are not straight, but have a zigzagged or other nonlinear configuration. In the other alternative embodiment, the fins 76$d$ are thinner than the fins shown in FIGS. 3-6, so that more fins of this thinner configuration can be disposed in the same reactor volume, thereby increasing the surface area onto which the catalyst can be plated. It is contemplated that other configurations of fins that increase the internal surface area of the reactor side can alternatively be employed. It is also contemplated that a single style of fins or a combination of fin styles can be employed. In general, it is preferable for each portion of the reactor to have similar fin configurations, so that the flow paths throughout different portions of the reactor are substantially the sane.

An alternative embodiment of an apparatus in accordance with the invention is designed to provide modest levels of electrical power, e.g., 35 watts, for long periods of time, without the need for maintenance (e.g., the re-supply of ammonia or adsorbent). One specific embodiment is adapted to supply electrical power on remote marine buoys (which generally collect weather data or facilitate navigation). A apparatus capable of producing 35 watts of power continuously weighs about 5 kg, plus the weight of the ammonia, the ammonia tank, and adsorbent. A six-month supply of ammonia and adsorbent has a mass of about 52 kg. Longer-duration operation can be achieved by increasing the ammonia tank capacity.

The functional elements of an ammonia-based hydrogen generation apparatus 10$a$ suitable for use in marine environments are illustrated in 12. These functional elements are identical to the functional elements illustrated in FIG. 1, except that an air blower 92 and an air cleaner 90 are included. Due to the marine environment, salt water must be removed from the air entering the fuel cell. The air blower, energized by electricity provided by fuel cell 22, is used to force air through the air cleaner. The air cleaner removes salt and water from the air that will be combined with hydrogen in fuel cell 22 to generate electricity. In this embodiment, a startup battery 94 is used to initially energize the air blower until the fuel cell begins to generate electricity. At that point, the fuel cell energizes the air blower, and can also be used to recharge the startup battery 94.

As illustrated, the heat source for ammonia-based hydrogen generation apparatus 10$a$ is preferably an electric heater, initially energized by startup battery 94, and then later by fuel cell 22. Alternatively, heat source 20 can be a hydrocarbon combustor or an ammonia combustor. While hydrocarbon fuels are more energy dense than ammonia, ammonia-based hydrogen generation apparatus 10$a$ is optimized for operating for long periods of time, rather than being designed for compactness. Eliminating the hydrocarbon fuel supply means a reduction in maintenance requirements, since only ammonia and adsorbent need to be re-supplied. Thus, for ammonia-based hydrogen generation apparatuses optimized to operate for long periods of time, electric heat or an ammonia combustor will be preferred as a heat source. The adsorbent supply 14 is charged with 2 kg of adsorbent, to enable ammonia-based hydrogen generation apparatus 10$a$ to generate 35 Watts of power continually for a 6-month period.

An ammonia-based hydrogen generation apparatus 10$b$ optimized for even more extended maintenance free periods of operation is shown in 13. A substantially larger ammonia supply 12$a$ is included. For example, a 150 kg ammonia supply provides enough ammonia for 18 months when used for producing sufficient hydrogen to generate 35 watts of continuous power.

Rather than employing a single adsorbent supply, ammonia-based hydrogen generation apparatus 10$b$ employs a pair of adsorbent supplies 14$a$ and 14$b$. While adsorbent supply 14$a$ is online, removing residual hydrogen from the reaction product gas, adsorbent supply 14$b$ is regenerated, and vice versa. In this manner, the required mass of adsorbent is significantly reduced. In fact, the mass of adsorbent required is no longer a function of the total volume of hydrogen product being filtered, but rather a function of the volume of hydrogen product being processed during the time required to regenerate the off-line adsorbent supply. If about ten hours are required to regenerate an adsorbent supply, then the required size of each adsorbent supply is based on the ten-hour flow rate of the hydrogen product. Without regenerating the adsorbent, such a apparatus could operate for twenty hours. But, by continually regenerating the adsorbent, and cycling between adsorbent supplies 14a and 14b following each regeneration, the apparatus can function for considerably longer than twenty hours. While after a certain number of regeneration cycles, the effectiveness of the adsorbent will decline; such a apparatus can operate for thousands of hours, before the adsorbent must be replaced. The ammonia that evolves during regeneration can be combusted to provide heat or cracked to generate hydrogen. Alternately, it can also be absorbed into an acidic solution.

In operation, ammonia from the ammonia supply 12a enters a valve 98a, which is used to direct the ammonia to the adsorbent supply 14a or 14b, that is currently online and not being regenerated. The ammonia supply line 15 passes through the online adsorbent supply, cooling the adsorbent. The ammonia then passes through the heat exchanger 16 and into the reactor 18. Once the hydrogen/nitrogen product exits the heat exchanger, a valve 98b is set to ensure that the reaction product enters the online adsorbent supply. The adsorbent removes ammonia from the hydrogen product so that it contains less than 1 ppm residual ammonia, and the substantially ammonia-free hydrogen is supplied to fuel cell 22 to generate electrical power.

Preferably, the heat source 20a is an electric heater, initially energized by a rechargeable startup battery 94, and then energized by a fuel cell 22, once the hydrogen generation has been initiated. The heat source not only provides thermal energy to reactor 18 to drive the ammonia decomposition reaction, but also to regenerate the offline adsorbent supply.

In preferred embodiments, the adsorbent is regenerated by heating. The adsorbent is heated at a temperature and for a time sufficient to drive off the absorbed ammonia, which can be combusted to generate heat or cracked to generate hydrogen. Heat source 20a can be a single resistance element for both adsorbent supplies and the reactor or and separate electrical heaters can be supplied for each adsorbent supply and for the reactor. One method of increasing the thermal efficiency of the apparatus is to incorporate a heat exchanger (not shown) in each adsorbent supply, and to direct the hot combustion gases from the reactor into the heat exchanger of the offline adsorbent supply, to supply some of the heat necessary for regenerating the adsorbent.

Air blower 92 and air filter 90a are shown as optional elements. The carbon regeneration process can be accomplished more rapidly, or at a lower temperature, if a stream of clean air is passed through the adsorbent during the regeneration process. A valve 98c ensures the air stream is directed to the adsorbent supply being regenerated. The design of air filter 90a is determined by the environment in which ammonia-base hydrogen generation apparatus 10b is deployed. In marine environments, filter 90a should be designed to remove water and salt. For desert environments, filter 90a should remove fine particulates (sand and grit).

Alternative embodiments include additional adsorbent supplies. Additional adsorbent supplies mean that longer regeneration cycles can be employed, without apparatus interruption.

Although the present invention has been described in connection with the preferred form of practicing it, those of ordinary skill in the art will understand that many modifications can be made thereto without departing from the spirit of the present invention. Accordingly, it is not intended that the scope of the invention in any way be limited by the above description.

What we claim is:

1. An ammonia-based hydrogen generation apparatus comprising:
   an only ammonia supply;
   a thermocatalytic hydrogen generation reactor including a reaction chamber in a heat exchange relationship with a combustion chamber;
   the reaction chamber being connected only to (a) an ammonia supply line for transporting ammonia from the only ammonia supply to the reaction chamber and (b) a reaction product supply line for transporting hydrogen from the reaction chamber;
   a combustion fluid supply line for transporting a combustible fluid to the combustion chamber;
   a combustion by-product exhaust line for transporting combustion by-products from the combustion chamber; and
   a heat source operationally connected to the reactor, wherein the hydrogen generation reactor includes a top plate, a bottom plate, and a reactor core disposed between the top and bottom plates,
   the reactor core having a reaction surface and a combustion surface, each surface having a raised periphery defining opposing ends and opposing sides, and the reaction core having a first set of spaced apart fins extending outwardly from the reaction surface to the top plate and a second set of spaced fins extending outwardly from the combustion surface, the first set of fins defining a first plurality of reaction channels and the second set of fins defining a second plurality of combustion channels, each set of channels creating gas flow paths in the direction of from one of the opposing side to the other opposing side and spaced apart from the opposing ends;
   the reaction surface and the top plate together defining the reaction chamber and the combustion surface and the bottom plate together defining the combustion chamber;
   wherein the ammonia supply line coaxially passes concentrically through a portion of the reaction product supply line outside of the reactor core and into the reactor core such that ammonia entering the reaction chamber is preheated by a reaction product leaving the reactor core; and
   wherein the reaction product contains at least 99.9% decomposed ammonia in the form only hydrogen and nitrogen and less than about 1000 ppm residual ammonia.

2. The hydrogen generation apparatus of claim 1 wherein at least one set of fins has a thickness of about 0.5 mm, a height of about 2 mm, and a length of about 50 mm and the spacing between adjacent fins is about 1 mm.

3. The hydrogen generation apparatus of claim 1 wherein the flow paths created by at least one of the sets of channels are straight.

4. The hydrogen generation apparatus of claim 1 wherein the flow paths created by at least one of the sets of channels are zigzagged.

5. The hydrogen generation apparatus of claim 1 wherein the reactor is fabricated from a nonrefactory metal.

6. The hydrogen generation apparatus of claim 5 wherein the nonrefactory metal is titanium or stainless steel.

7. The hydrogen generation apparatus of claim 1 further comprising the reactor chamber is loaded with an ammonia decomposition catalyst having a light-off temperature below 600° C.

8. The hydrogen generation apparatus of claim 7 wherein the catalyst is packed in the reaction channels.

9. The hydrogen generation apparatus of claim 7 wherein the catalyst is coated on the internal surface of the flow channels in the reaction chamber.

10. The hydrogen generation apparatus of claim 7 wherein the ammonia decomposition catalyst contains ruthenium.

11. The hydrogen generation apparatus of claim 7 wherein the ammonia decomposition catalyst contain nickel.

12. The hydrogen generation apparatus of claim 1 wherein either one or the other of the ammonia supply line and the reaction product line enters the reactor core from the first opposing end and extends, parallel to the second set of fins, into the reactor core ending at a point adjacent the opposite end of the reactor and the other of the ammonia supply line and the reaction product line, terminates at the first opposing end.

13. The hydrogen generation apparatus of claim 1 further comprising a combustion catalyst disposed in the combustion chamber between the second end of the first set of fins and the end of the combustion fluid line.

14. The hydrogen generation apparatus of claim 13 wherein the combustion catalyst is a platinum combustion catalyst.

15. The hydrogen generation apparatus of claim 1 wherein the heat source is an ammonia combustor fluidly connected to the only ammonia supply.

16. The hydrogen generation apparatus of claim 1 wherein the only ammonia supply supplies ammonia to the ammonia combustor.

17. The hydrogen generation apparatus of claim 1 wherein the heat source is a hydrocarbon combustor.

18. The hydrogen generation apparatus of claim 1 wherein the combustion fluid line enters the reactor core from the first opposing end and extends, parallel to the first set of fins, into the reactor core ending at a point adjacent the opposite end of the reactor.

19. The hydrogen generation apparatus of claim 17 further comprising a hydrocarbon supply of butane.

20. The hydrogen generation apparatus of claim 1 further comprising a first adsorbent supply connected to the reaction product supply line for removing residual ammonia from the hydrogen.

21. The hydrogen generation apparatus of claim 1 wherein the ammonia supply line is made of a heat conducting material and passes through the adsorbent supply, and wherein the ammonia supply line is surrounded by the adsorbent.

22. The hydrogen generation apparatus of claim 1 wherein the adsorbent surface is impregnated to include bound acid molecules.

23. The hydrogen generation apparatus of claim 22 wherein the adsorbent has from 2 millimoles of strong acid adsorption sites per gram of carbon to 5 millimoles of strong acid adsorption sites per gram of carbon.

24. The hydrogen generation apparatus of claim 20 further comprising a second adsorbent supply connected to the reaction product supply line for removing residual ammonia from the hydrogen, a first valve for selectively directing ammonia from the only ammonia supply to either the first or the second adsorbent supply and a second valve for selectively directing reaction products to either the first or the second adsorbent supply.

25. The hydrocarbon generation apparatus of claim 1 further comprising a heat exchanger operably connected to the combustion by-products exhaust line and to the ammonia supply line external to the reactor.

26. The hydrogen generation apparatus of claim 25 wherein the heat exchanger is disposed in the combustion by-products exhaust line between the reactor and the adsorbent supply.

27. The hydrogen generation apparatus of claim 1 further comprising a fuel cell fluidly connected to the reaction product supply line.

28. An ammonia-based hydrogen generation apparatus comprising:
an only ammonia supply;
a thermocatalytic hydrogen generation reactor including a top plate, a bottom late, and a reactor core disposed between the top and bottom plates,
the reactor core having a reaction surface and a combustion surface, each surface having a raised periphery defining opposing ends and opposing sides, and the reaction core having a first set of spaced apart fins extending outwardly from the reaction surface to the top plate and a second set of spaced fins extending outwardly from the combustion surface, the first set of fins defining a first plurality of reaction channels and the second set of fins defining a second plurality of combustion channels, each set of channels creating gas flow paths in the direction of from one of the opposing side to the other opposing side and spaced apart from the opposing ends,
the reaction surface and the top plate together defining a reaction chamber and the combustion surface and the bottom plate together defining a combustion chamber;
an ammonia decomposition catalyst having a light-off temperature below 600° C. loaded in the reactor chamber;
a platinum combustion catalyst disposed in the combustion chamber between the second end of the first set of fins and the end of the combustion fluid line;
the reaction chamber being connected only to (a) an ammonia supply line for transporting ammonia from the only ammonia supply to the reaction chamber and (b) a reaction product supply line for transporting hydrogen from the reaction chamber;
wherein the ammonia supply line coaxially passes concentrically through a portion of the reaction product supply line outside of the reactor core and into the reactor core such that ammonia entering the reaction chamber is preheated by the reaction product leaving the reactor core;
a combustion fluid supply line for transporting a combustible fluid to the combustion chamber;
a combustion by-product exhaust line for transporting combustion by-products from the combustion chamber; and
a hydrocarbon combustor connected to the reactor;
a carbon adsorbent supply, whose surface is impregnated to include bound acid molecules, connected to the reaction product supply line for removing residual ammonia from the hydrogen and having from 2 millimoles of strong acid adsorption sites per gram of carbon to 5 millimoles of strong acid adsorption sites per gram of carbon, the ammonia supply line being made of a heat conducting material, and the ammonia supply line passing through the adsorbent supply;
a heat exchanger operably connected to the combustion by-products exhaust line, between the reactor and the adsorbent supply and to the ammonia supply line and situated external to the reactor core; and
a fuel cell fluidly connected to the reaction product supply line; and wherein the reaction product contains at least 99.9% decomposed ammonia in the form only hydrogen and nitrogen and less than about 1000 ppm residual ammonia.

29. The hydrogen generation apparatus of claim 28 wherein the flow paths created by at least one of the sets of channels are straight.

30. The hydrogen generation apparatus of claim 28 wherein the flow paths created by at least one of the sets of channels are zigzagged.

31. The hydrogen generation apparatus of claim 28 wherein the catalyst is packed in the reaction channels.

32. The hydrogen generation apparatus of claim 28 wherein the catalyst is coated on the internal surface of the flow channels in the reaction chamber.

33. The hydrogen generation apparatus of claim 28 wherein the ammonia decomposition catalyst contains ruthenium.

34. The hydrogen generation apparatus of claim 28 wherein the ammonia decomposition catalyst contain nickel.

35. The hydrogen generation apparatus of claim 28 wherein the ammonia supply line and the reaction product line enter the reactor core from the first opposing end and extends, parallel to the second set of fins, into the reactor core ending at a point adjacent the opposite end of the reactor and the other terminates at the first opposing end.

36. The hydrogen generation apparatus of claim 28 wherein the combustion fluid line enters the reactor core from the first opposing end and extends, parallel to the first set of fins, into the reactor core ending at a point adjacent the opposite end of the reactor.

37. An ammonia-based hydrogen generation apparatus comprising:
an only ammonia supply;
a thermocatalytic hydrogen generation reactor wherein the hydrogen generation reactor includes a top plate, a bottom plate, and a reactor core disposed between the top and bottom plates,
the reactor core having a reaction surface and a combustion surface, the reaction surface and the top plate together defining the reaction chamber and the combustion surface and the bottom plate together defining the combustion chamber, the reaction core having a first set of spaced apart fins extending outwardly from the reaction surface to the top plate, and the first set of fins being spaced apart from opposing ends of the reactor core;
the reaction chamber being connected only to (a) an ammonia supply line for transporting ammonia from the only ammonia supply to the reaction chamber and (b) a reaction product supply line for transporting hydrogen from the reaction chamber;
a combustion fluid supply line for transporting a combustible fluid to the combustion chamber;
a combustion by-product exhaust line for transporting combustion by-products from the combustion chamber;
a heat source operationally connected to the reactor; and
a first adsorbent supply connected to the hydrogen fluid line for removing residual ammonia from the hydrogen and where the ammonia supply line is made of a heat conducting material and passes through the adsorbent supply and is surrounded by the adsorbent;
wherein the ammonia supply line coaxially passes concentrically through a portion of the reaction product supply line outside of the reactor core and into the reactor core such that ammonia entering the reaction chamber is preheated by the reaction product leaving the reactor core; and wherein the reaction product contains at least 99.9% decomposed ammonia in the form only hydrogen and nitrogen and less than about 1000 ppm residual ammonia.

38. The hydrogen generation apparatus of claim 37 wherein the adsorbent is a carbon adsorbent whose surface is impregnated to include bound acid molecules.

39. The hydrogen generation apparatus of claim 38 wherein the adsorbent has from 2 millimoles of strong acid adsorption sites per gram of carbon to 5 millimoles of strong acid adsorption sites per gram of carbon.

40. The hydrogen generation apparatus of claim 37 further comprising a second adsorbent supply connected to the reaction product supply line for removing residual ammonia from the hydrogen, a first valve for selectively directing ammonia from the only ammonia supply to either the first or the second adsorbent supply, and a second valve for electively directing reaction products to either the first or the second the second adsorbent supply.

41. The hydrocarbon generation apparatus of claim 37 further comprising a heat exchanger, operably connected to the combustion by-products exhaust line and to the ammonia supply line and situated external to the reactor core.

42. The hydrogen generation apparatus of claim 41 wherein the heat exchanger is disposed in the combustion by-products exhaust line between the reactor and the adsorbent supply.

43. The hydrogen generation apparatus of claim 37 wherein the heat source is an electrical heater.

44. The hydrogen generation apparatus of claim 43 wherein the electrical heater is a battery.

45. The hydrogen generation apparatus of claim 44 wherein the electrical heater is a fuel cell.

46. The hydrogen generation apparatus of claim 45 further comprising a fuel cell fluidly connected to the reaction product supply line.

47. An ammonia-based hydrogen generation apparatus comprising:
an only ammonia supply;
a thermocatalytic hydrogen generation reactor wherein the hydrogen generation reactor includes a top plate, a bottom plate, and a reactor core disposed between the top and bottom plates,
the reactor core having a reaction surface and a combustion surface, the reaction surface and the top plate together defining the reaction chamber and the combustion surface and the bottom plate together defining the combustion chamber, the reaction core having a first set of spaced apart fins extending outwardly from the reaction surface to the top plate and a second set of spaced fins extending outwardly from the combustion surface, and each set of fins being spaced apart from opposing ends of the reactor core;
the reaction chamber being connected only to (a) an ammonia supply line for transporting ammonia from the only ammonia supply to the reaction chamber and (b) a reaction product supply line for transporting hydrogen from the reaction chamber;
wherein the ammonia supply line coaxially passes concentrically through a portion of the reaction product supply line outside of the reactor core and into the reactor core such that ammonia entering the reaction chamber is preheated by the reaction product leaving the reactor core;
a combustion fluid supply line for transporting a combustible fluid to a combustion chamber;

a combustion by-product exhaust line for transporting combustion by-products from the combustion chamber;

a heat source operationally connected to the reactor;

a first adsorbent supply containing carbon adsorbent, whose surface is impregnated to include bound acid molecules, having from 2 millimoles of strong acid adsorption sites per gram of carbon to 5 millimoles of strong acid adsorption sites per gram of carbon connected to the hydrogen fluid line for removing residual ammonia from the hydrogen and wherein the ammonia supply line is made of a heat conducting material and passes through the adsorbent supply;

a heat exchanger disposed in the combustion by-products exhaust line between the reactor and the adsorbent supply;

a fuel cell fluidly connected to the reaction product supply line; and wherein the reaction product contains at least 99.9% decomposed ammonia in the form only hydrogen and nitrogen and less than about 1000 ppm residual ammonia.

48. The hydrogen generation apparatus of claim 47 further comprising a second adsorbent supply connected to the reaction product supply line for removing residual ammonia from the hydrogen, a first valve for selectively directing ammonia from the only ammonia supply to either the first or the second adsorbent supply, and a second valve for selectively directing reaction products to either the first or the second the second adsorbent supply.

49. An ammonia-based hydrogen generation apparatus comprising:

an only ammonia supply;

a thermocatalytic hydrogen generation reactor wherein the hydrogen generation reactor includes a top plate, a bottom plate, and a reactor core disposed between the top and bottom plates, the reactor core having a reaction surface and a combustion surface, the reaction surface and the top plate together defining the reaction chamber and the combustion surface and the bottom plate together defining the combustion chamber, the reaction core having a first set of spaced apart fins extending outwardly from the reaction surface to the top plate and a second set of spaced fins extending outwardly from the combustion surface, and each set of fins being spaced apart from opposing ends of the reactor core;

the reaction chamber being connected only to (a) an ammonia supply line for transporting ammonia from the only ammonia supply to the reaction chamber and (b) a reaction product supply line for transporting hydrogen from the reaction chamber;

wherein the ammonia supply line coaxially passes concentrically through a portion of the reaction product supply line outside of the reactor core and into the reactor core such that ammonia entering the reaction chamber is preheated by the reaction product leaving the reactor core;

a combustion fluid supply line for transporting a combustible fluid to the combustion chamber;

a combustion by-product exhaust line for transporting combustion by-products from the combustion chamber;

a heat source operationally connected to the reactor;

a heat exchanger operably connected to the combustion by-products exhaust line and to the ammonia supply line and situated external to the reactor; and wherein the reaction product contains at least 99.9% decomposed ammonia in the form only hydrogen and nitrogen and less than about 1000 ppm residual ammonia.

50. The hydrogen generation apparatus of claim 49 wherein the heat exchanger is disposed in the combustion by-products exhaust line between the reactor and the adsorbent supply and external to the reactor core.

51. The hydrogen generation apparatus of claim 49 wherein the heat source is an electrical heater.

52. The hydrogen generation apparatus of claim 51 wherein the electrical heater is a battery.

53. The hydrogen generation apparatus of claim 51 wherein the electrical heater is a fuel cell.

54. The hydrogen generation apparatus of claim 49 further comprising a fuel cell fluidly connected to the reaction product supply line.

* * * * *